(12) United States Patent
Papasakellariou et al.

(10) Patent No.: US 11,659,570 B2
(45) Date of Patent: May 23, 2023

(54) METHOD AND APPARATUS FOR SCHEDULING COMMUNICATION FOR LOW CAPABILITY DEVICES

(71) Applicant: Samsung Electronics Co., Ltd., Suwon-si (KR)

(72) Inventors: Aris Papasakellariou, Houston, TX (US); Hyoung-Ju Ji, Seoul (KR); Young-Bum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/497,415

(22) Filed: Oct. 8, 2021

(65) Prior Publication Data

US 2022/0030567 A1 Jan. 27, 2022

Related U.S. Application Data

(63) Continuation of application No. 16/872,739, filed on May 12, 2020, now Pat. No. 11,172,480, which is a
(Continued)

(51) Int. Cl.
*H04L 1/00* (2006.01)
*H04W 72/23* (2023.01)
(Continued)

(52) U.S. Cl.
CPC .......... *H04W 72/23* (2023.01); *H04L 1/0038* (2013.01); *H04L 1/1671* (2013.01);
(Continued)

(58) Field of Classification Search
CPC .. H04W 72/042; H04L 1/0038; H04L 1/1671; H04L 1/1822; H04L 1/0061; H04L 5/0053
See application file for complete search history.

(56) References Cited

U.S. PATENT DOCUMENTS

2009/0088148 A1\* 4/2009 Chung .................. H04L 5/0053
455/423
2009/0213803 A1 8/2009 Lee et al.
(Continued)

FOREIGN PATENT DOCUMENTS

EP 2 182 689 A2 5/2010
EP 2 498 561 A1 9/2012
(Continued)

OTHER PUBLICATIONS

Catt "System Level Evaluation on Compact DCI Formats", R1-113717, Nov. 14-18, 2011.
(Continued)

*Primary Examiner* — Samina F Choudhry
(74) *Attorney, Agent, or Firm* — Jefferson IP Law, LLP

(57) ABSTRACT

Methods and apparatus are described for a User Equipment (UE) with reduced processing capabilities (e.g., Machine Type Communication (MTC) UE) to transmit and receive signaling are provided. The Downlink Control Information (DCI) formats scheduling a transmission of a Physical Uplink Shared CHannel (PUSCH) or a reception of a Physical Downlink Shared CHannel (PDSCH) are designed and have a smaller size than respective DCI formats for conventional UEs. DCI formats scheduling PUSCHs to or PDSCHs for a group of MTC UEs are also designed and can have a same size as DCI formats scheduling PUSCH or PDSCH for an individual MTC UE.

8 Claims, 14 Drawing Sheets

Related U.S. Application Data continuation of application No. 16/050,360, filed on Jul. 31, 2018, now Pat. No. 10,652,875, which is a continuation of application No. 13/750,214, filed on Jan. 25, 2013, now Pat. No. 10,039,088.

(60) Provisional application No. 61/590,991, filed on Jan. 26, 2012.

(51) Int. Cl.
*H04L 1/1607* (2023.01)
*H04L 1/1822* (2023.01)
*H04L 5/00* (2006.01)

(52) U.S. Cl.
CPC .......... *H04L 1/1822* (2013.01); *H04L 1/0061* (2013.01); *H04L 5/0053* (2013.01)

(56) References Cited

U.S. PATENT DOCUMENTS

| | | |
|---|---|---|
| 2009/0213876 A1 | 8/2009 | Wang et al. |
| 2009/0276675 A1 | 11/2009 | Ojala et al. |
| 2009/0300456 A1 | 12/2009 | Pelletier et al. |
| 2010/0080187 A1 | 4/2010 | Papasakellariou et al. |
| 2010/0195614 A1 | 8/2010 | Nimbalker et al. |
| 2012/0004003 A1 | 1/2012 | Shaheen et al. |
| 2012/0113831 A1 | 5/2012 | Pelletier et al. |
| 2012/0182944 A1 | 7/2012 | Sorrentino et al. |
| 2012/0195627 A1 | 8/2012 | Dai et al. |
| 2012/0250656 A1 | 10/2012 | Noh et al. |
| 2012/0314656 A1 | 12/2012 | Hong et al. |
| 2013/0039284 A1* | 2/2013 | Marinier ................. H04L 5/001 370/329 |
| 2013/0083753 A1 | 4/2013 | Lee et al. |
| 2013/0102342 A1 | 4/2013 | Tesanovic et al. |
| 2013/0128838 A1 | 5/2013 | Montojo et al. |
| 2013/0343313 A1 | 12/2013 | Takeda et al. |

FOREIGN PATENT DOCUMENTS

| | | |
|---|---|---|
| WO | 2009041785 A2 | 4/2009 |
| WO | 2011032342 A1 | 3/2011 |
| WO | 2011054188 A1 | 5/2011 |
| WO | 2011083946 A2 | 7/2011 |
| WO | 2011085230 A2 | 7/2011 |

OTHER PUBLICATIONS

Korean Decision of Grant dated Dec. 2, 2019, issued in Korean Patent Application No. 10-2013-0009049.

Huawei, HiSilcon, "Control Signalling design for UL MIMO", Oct. 11, 2010, Xi'an, China, R1-105136.

European Office Action dated Feb. 15, 2019, issued in European Patent Application No. 13 740 554.4.

Samsung, R1-114245, Standards aspects impacting low-cost MTC UEs, 3GPP TSG RAN WG1 #67, 3GPP, server publication date (Nov. 8, 2011.

ETS1 TS 136 212 V10.1.0, "Multiplexing and channel coding", Apr. 2011.

Korean Office Action dated Jul. 30, 2019, issued in Korean Patent Application No. 10-2013-0009049.

* cited by examiner

METHOD AND APPARATUS FOR SCHEDULING COMMUNICATION FOR LOW CAPABILITY DEVICES

CROSS-REFERENCE TO RELATED APPLICATION(S)

This application is a continuation application of prior application Ser. No. 16/872,739, filed on May 12, 2020, which is a continuation application of prior application Ser. No. 16/050,360, filed on Jul. 31, 2018, which has issued as U.S. Pat. No. 10,652,875 on May 12, 2020, which is a continuation application of prior application Ser. No. 13/750,214, filed on Jan. 25, 2013, which has issued as U.S. Pat. No. 10,039,088 on Jul. 31, 2018, and was based on and claimed priority under 35 U.S.C. § 119(e) of a United States Provisional application filed No. 61/590,991, filed on Jan. 26, 2012, in the U.S. Patent and Trademark Office, the disclosure of which is incorporated by reference herein in its entirety.

BACKGROUND OF THE INVENTION

1. Field of the Invention

The present invention relates to wireless communication systems. More particularly, the present invention relates to the design of downlink control information formats scheduling data transmissions to or data receptions from User Equipment (UE) with limited capabilities.

2. Description of the Art

A communication system includes a DownLink (DL) that conveys transmission signals from transmission points such as Base Stations (BS or NodeBs) to User Equipments (UEs), and an UpLink (UL) that conveys transmission signals from UEs to reception points such as NodeBs. A UE, also commonly referred to as a terminal or a mobile station, may be fixed or mobile and may be a cellular phone, a personal computer device, and the like. A NodeB, which is generally a fixed station, may also be referred to as an access point or other equivalent terminology.

DL signals includes data signals, which carry the information content, control signals, and Reference Signals (RSs), which are also known as pilot signals. A NodeB conveys data information to UEs through respective Physical Downlink Shared CHannels (PDSCHs) and control information through respective DL Control CHannels (CCHs). Multiple RS types may be supported, such as for example a Common RS (CRS) transmitted over substantially the entire DL BandWidth (BW) BW and the DeModulation RS (DMRS) transmitted in a same BW as an associated PDSCH.

UL signals also include data signals, control signals and RSs. UEs convey data information to NodeBs through respective Physical Uplink Shared CHannels (PUSCHs) and control information through respective Physical Uplink Control CHannels (PUCCHs). A UE transmitting data information may also convey control information through a PUSCH. The RS may be a DMRS or a Sounding RS (SRS) which a UE may transmit independently of a PUSCH.

FIG. 1 is a diagram illustrating a structure for a DownLink (DL) Transmission Time Interval (TTI) according to the related art.

Referring to FIG. 1, a DL TTI includes one subframe 110 which includes two slots 120 and a total of $N_{symb}^{DL}$ symbols used for transmitting data information, DL Control Information (DCI), or RS. The first $M_{symb}^{DL}$ symbols are used to transmit DL CCHs 130. The first $M_{symb}^{DL}$ symbols may be dynamically indicated in each DL TTI through a Physical Control Format Indicator CHannel (PCFICH). The remaining $N_{symb}^{DL} - M_{symb}^{DL}$ symbols are primarily used to transmit PDSCHs 140. The transmission BW includes frequency resource units referred to as Resource Blocks (RBs). Each RB includes $N_{sc}^{RB}$ sub-carriers, or Resource Elements (REs), and a UE can be allocated $M_{PDSCH}$ RBs for a total of $M_{sc}^{PDSCH} = M_{PDSCH} \cdot N_{sc}^{RB}$ REs for a PDSCH transmission BW in a DL TTI. Some REs in some symbols contain CRS (or DMRS) 150 which enable channel estimation and coherent demodulation of data signals or control signals at a UE. A PDSCH transmission in a second slot may be at a same BW or at a different BW than in a first slot. In the former case, the PDSCH transmission is referred to as localized. In contrast, in the latter case the PDSCH transmission is referred to as distributed.

A PDSCH transmission to a UE or a PUSCH transmission from a UE may be scheduled by a NodeB through a transmission of a respective Physical DL Control CHannel (PDCCH) conveying a DCI format which provides information for a respective PDSCH or PUSCH transmission as it is subsequently described. A PDSCH or a PUSCH transmission may also be Semi-Persistently Scheduled (SPS) by a NodeB through higher layer signaling, such as Radio Resource Control (RRC) signaling, in which case it occurs at predetermined TTIs and with predetermined parameters specified by the higher layer signaling.

To avoid a PDCCH transmission to a UE that is blocking a PDCCH transmission to another UE, a location of each PDCCH transmission in the time-frequency domain of a DL control region is not unique. Therefore, a UE may perform multiple decoding operations per DL subframe to determine whether there are PDCCHs intended for the UE in a DL subframe. The resource unit for a PDCCH transmission is referred to as a Control Channel Element (CCE) and includes multiple REs. For a given number of DCI format bits, a number of CCEs for a respective PDCCH depends on a channel coding rate (Quadrature Phase Shift Keying (QPSK) is assumed as the modulation scheme). A NodeB may use a lower channel coding rate (e.g., more CCEs) for transmitting a PDCCH to a UE experiencing low DL Signal to Interference and Noise Ratio (SINR) than to a UE experiencing a high DL SINR. The CCE Aggregation Levels (ALs) may include, for example, 1, 2, 4, and 8 CCEs.

A NodeB may also transmit ACKnowledgement information associated with a Hybrid Automatic Repeat reQuest (HARQ) process (HARQ-ACK information) for transmission of data Transport Blocks (TBs) in respective PUSCHs. HARQ-ACK signals through respective Physical Hybrid-ARQ Indicator CHannels (PHICHs) inform respective UEs whether transmissions of respective data TBs were correctly or incorrectly detected by a NodeB. For a PUSCH transmission scheduled by PDCCH, the PHICH resource $n_{PHICH}$ can be assumed to be derived as in Equation (1)

$$n_{PHICH} = f(I_{PRB\_RA}^{lowest\_index}, n_{DMRS}, N_{PHICH}) \quad (1)$$

where $f(\bullet)$ is a function of a first UL RB $I_{PRB\_RA}^{lowest\_index}$ for a respective PUSCH, of a $n_{DMRS}$ parameter provided in a DCI format scheduling the PUSCH as it is subsequently described, and of other parameters. $N_{PHICH}$ is informed to a UE through higher layer signaling by a NodeB. For a SPS PUSCH, a PHICH resource can be assigned to a UE through higher layer signaling.

The DL control region in FIG. 1 uses a maximum of $M_{symb}^{DL}=3$ subframe symbols, and a PDCCH is transmitted substantially over a total DL BW. As a consequence, such control region has limited capacity and cannot achieve interference coordination in the frequency domain. Expanded PDCCH capacity or PDCCH interference coordination in the frequency domain is needed in several cases. One such case is an extensive use of spatial multiplexing for PDSCH transmissions in which multiple DL SAs schedule same PDSCH resources to respectively multiple UEs. Another case is for heterogeneous networks in which DL transmissions in a first cell experience strong interference from DL transmissions in a second cell and DL interference co-ordination in the frequency domain between the two cells is needed.

A direct extension of a DL control region as in FIG. 1 to more than $M_{symb}^{DL}=3$ subframe symbols is not possible at least due to a requirement to support UEs which cannot be aware of such extension. An alternative is to support DL control signaling in a PDSCH region according to the related art by using individual RBs to transmit control signals. A PDCCH transmitted in RBs of a PDSCH region according to the related art will be referred to as Enhanced PDCCH (EPDCCH).

FIG. 2 is a diagram illustrating EPDCCH transmissions in a DL subframe according to the related art.

Referring to FIG. 2, although EPDCCH transmissions start immediately after a DL control region 210 according to the related art and are over all remaining subframe symbols, EPDCCH transmissions may instead always start at a fixed location, such as the fourth subframe symbol, and extend over a part or all of the remaining subframe symbols. EPDCCH transmissions occur in four RBs, 220, 230, 240, and 250, while remaining RBs can be used to transmit PDSCHs 260, 262, 264, 266, and 268. An enhanced PCFICH (EPCFICH) or an Enhanced PHICH (EPHICH) may also be supported. In a DL TTI, an Enhanced Control CHannel (ECCH), referring to an EPDCCH, an EPCFICH, or an EPHICH, may be transmitted in a same RB, in which case the ECCH is referred to as localized, or over multiple RBs, in which case the ECCH is referred to as distributed.

Demodulation of information conveyed by an EPDCCH may be based on a CRS or on a DMRS. A DMRS is transmitted in some subframe symbols and in a subset of REs in RBs used for an associated EPDCCH transmission.

FIG. 3 is a diagram illustrating a DMRS structure in a RB over a DL TTI according to the related art.

Referring to FIG. 3, the DMRS REs 310 are placed in some subframe symbols of a RB used to transmit an ECCH. For orthogonal multiplexing of different DMRS, a first DMRS transmission is assumed to use an Orthogonal Cover Code (OCC) of $\{1, 1\}$ over two respective REs that are located in a same frequency position and are successive in the time domain while a second DMRS transmission is assumed to use an OCC of $\{1, -1\}$.

FIG. 4 is a diagram illustrating an encoding and transmission process for a DCI format according to the related art.

Referring to FIG. 4, a NodeB separately encodes and transmits each DCI format in a respective PDCCH or EPDCCH. A Radio Network Temporary Identifier (RNTI) for a UE, for which a DCI format is intended for, masks a Cyclic Redundancy Check (CRC) of a DCI format codeword in order to enable the UE to identify that a particular DCI format is intended for the UE. The CRC of (non-coded) DCI format bits 410 is computed using a CRC computation operation 420, and the CRC is then masked using an exclusive OR (XOR) operation 430 between CRC and RNTI bits 440. The XOR operation 430 is defined as: XOR(0,0)=0, XOR(0,1)=1, XOR(1,0)=1, XOR(1,1)=0. The masked CRC bits are appended to DCI format information bits using a CRC append operation 450, channel coding is performed using a channel coding operation 460, for example using a Tail Biting Convolutional Code (TBCC), followed by rate matching operation 470 applied to allocated resources, and finally, an interleaving and a modulation 480 operation, after which the output control signal 490 is transmitted. In the present example, both a CRC and a RNTI include 16 bits.

FIG. 5 is a diagram illustrating a reception and decoding process for a DCI format according to the related art.

Referring to FIG. 5, a UE receiver performs the reverse operations of a NodeB transmitter to determine whether the UE has a DCI format assignment in a DL subframe. A received control signal 510 is demodulated and the resulting bits are de-interleaved at operation 520, a rate matching applied at a NodeB transmitter is restored through operation 530, and control data is subsequently decoded at operation 540. After decoding the control data, DCI format information bits 560 are obtained after extracting CRC bits 550 which are then de-masked 570 by applying the XOR operation with a UE RNTI 580. Finally, a UE performs a CRC test 590. If the CRC test passes, a UE detects a DCI format and determines parameters for signal reception or signal transmission. If the CRC test does not pass, a UE disregards a presumed DCI format.

FIG. 6 is a diagram illustrating a PUSCH transmission structure over an UL TTI according to the related art.

Referring to FIG. 6, an UL TTI includes one subframe 610 which includes two slots. Each slot 620 includes $N_{symb}^{UL}$ symbols 630 used for transmitting data information, UL Control Information (UCI), or RS. A PUSCH transmission in one slot may be either at a same BW or at a different BW than a PUSCH transmission in the other slot. Some symbols in each slot are used to transmit RS 640 which enables channel estimation and coherent demodulation of received data information and/or UCI at a NodeB. A UE is allocated $M_{PUSCH}$ RBs 650 for a total of $M_{sc}^{PUSCH}=M_{PUSCH} \cdot N_{sc}^{RB}$ REs for a PUSCH transmission BW. The last subframe symbol may be used for SRS transmission 660 from one or more UEs. The main purpose of a Sounding Reference Signal (SRS) is to provide a NodeB with an estimate for a UL channel medium experienced by a respective UE. SRS transmission parameters for each UE are configured by a NodeB through higher layer signaling.

A UE transmits UCI to provide a NodeB information related to PDSCH transmissions to the UE or PUSCH transmissions from the UE. UCI includes HARQ-ACK information regarding a correct or incorrect detection of data TBs, Channel State Information (CSI) for a DL channel a UE experiences, and a Service Request (SR) informing a NodeB that a UE has data to transmit. A UE transmitting PUSCH may also provide a NodeB with a Buffer Status Report (BSR) informing a NodeB of an amount of data a UE has for transmission in its buffer.

FIG. 7 is a diagram illustrating a PUCCH structure for HARQ-ACK signal transmission according to the related art.

Referring to FIG. 7, HARQ-ACK signals and RS enabling coherent demodulation of HARQ-ACK signals are transmitted in one slot 710 of a PUCCH subframe including 2 slots. The transmission in the other slot can be at a different part of an UL BW. HARQ-ACK information bits 720 modulate 730 a Zadoff-Chu (ZC) sequence 740, for example using Binary Phase Shift Keying (BPSK) for 1 HARQ-ACK bit or QPSK for 2 HARQ-ACK bits, which is then transmitted after performing a Inverse Fast Fourier Transform (IFFT) operation 750. Each RS 760 is transmitted using an unmodulated ZC sequence.

For an UL system BW of $N_{RB}^{UL}$ RBs, a ZC sequence $r_{u,v}^{(\alpha)}(n)$ is defined by a Cyclic Shift (CS) a of a base ZC sequence $\bar{r}_{u,v}(n)$ according to $r_{u,v}^{(\alpha)}(n) = e^{j\alpha n}\bar{r}_{u,v}(n)$, $0 \le n \le M_{sc}^{RS}$, where $M_{sc}^{RS} = mN_{sc}^{RB}$ is the length of the ZC sequence, $1 \le m \le N_{RB}^{UL}$, and $\bar{r}_{u,v}(n) = x_q(n \bmod N_{ZC}^{RS})$ where the $q^{th}$ root ZC sequence is defined by $$x_q(m) = \exp\left(\frac{-j\pi qm(m+1)}{N_{ZC}^{RS}}\right), 0 \le m \le N_{ZC}^{RS} - 1$$

with q given by $q = \lfloor \bar{q} + 1/2 \rfloor + v \cdot (-1)^{\lfloor 2\bar{q} \rfloor}$ and $\bar{q}$ given by $\bar{q} = N_{ZC}^{RS} \cdot (u+1)/31$. The length $N_{ZC}^{RS}$ of a ZC sequence is given by the largest prime number such that $N_{ZC}^{RS} < M_{sc}^{RS}$. Multiple RS sequences can be defined from a single base sequence through different values of α. A PUCCH is assumed to be transmitted in one RB ($M_{sc}^{RS} = N_{sc}^{RB}$).

FIG. 8 is a diagram illustrating a transmitter for a ZC sequence according to the related art.

Referring to FIG. 8, a mapper 820 maps a ZC sequence 810 to REs of an assigned transmission BW as REs of the assigned transmission BW are indicated by RE selection unit 825. An IFFT is then performed by IFFT unit 830, a CS is applied to the output by CS unit 840, followed by scrambling with a cell-specific sequence using scrambler 850. A resulting signal is filtered by filter 860, a transmission power is applied by power amplifier 870, and a ZC sequence is transmitted 880. As an example, the reverse operations are performed at a NodeB receiver. Without modulation, a ZC sequence serves as a RS. With modulation, a ZC sequence serves as a HARQ-ACK signal or as a CSI signal. The SR may be transmitted using an unmodulated ZC sequence through On-Off Keying.

Different CSs of a ZC sequence provide orthogonal ZC sequences. Therefore, different CSs α of a same ZC sequence can be allocated to different UEs in a same PUCCH RB and achieve orthogonal multiplexing for transmissions of HARQ-ACK signals or of CSI signals, and RS. For a RB including $N_{sc}^{RB} = 12$ REs, there are 12 different CS. The number of usable CS depends on the channel dispersion characteristics and can typically range between 3 and 12. Orthogonal multiplexing can also be in the time domain using OCC where PUCCH symbols conveying a same signal type in each slot are multiplied with elements of an OCC. For example, for the structure in FIG. 7, an HARQ-ACK signal in each slot can be modulated by a length-4 OCC, such as a Walsh-Hadamard (WH) OCC, while a RS in each slot can be modulated by a length-3 OCC, such as a DFT OCC. In this manner, the multiplexing capacity per RB per subframe is increased by a factor of 3 (e.g., determined by the OCC with the smaller length $N_{oc}$).

A UE may implicitly determine a PUCCH resource, $n_{PUCCH}$, for HARQ-ACK signal transmission, in response to a PDSCH reception scheduled by a PDCCH, based on a first CCE, $n_{CCE}$, used to transmit the PDCCH as in Equation (2)

$$n_{PUCCH} = n_{CCE} + N_{PUCCH} \quad (2)$$

where $N_{PUCCH}$ is an offset informed to the UE by the NodeB through higher layer signaling. The PUCCH resource provides a CS and an OCC at an RB for HARQ-ACK signal transmission. For SPS PDSCH, a PUCCH resource for HARQ-ACK signal transmission may be assigned to a UE by a NodeB through higher layer signaling.

Encoding of DCI is based on a TBCC while encoding of data information is based on a turbo code. This is due to the better performance of a TBCC for payloads less than about 100 bits, such as the TBCC included in DCI formats, and the better performance of a turbo code for payloads above about 100 bits, such as the TBCC included in data TBs.

FIG. 9 is a diagram providing a detection performance for a TBCC and for a turbo code according to the related art.

Referring to FIG. 9, the detection performance is provided in terms of required SINR to achieve a target BLock Error Rate (BLER) of 0.01 which is typically used for DCI, as a function of the payload assuming a coding rate of 1/3. In general, as a target BLER increases, a number of bits for which a TBCC outperforms a turbo code decreases. For example, although not illustrated for brevity, for a target BLER of 0.1 which is typically used for detection of data information, a TBCC outperforms a turbo code for payloads smaller than about 70-80 bits.

A DCI format scheduling a PDSCH or a PUSCH includes several Information Elements (IEs). Different DCI formats may be associated with different PDSCH or PUSCH Transmission Modes (TMs) configured to a UE. For example, a first DCI format can be used to schedule a transmission of only one data TB to or from a UE while a second DCI format can be used to schedule a transmission of up to two data TBs. Exemplary embodiments of the present invention focus on DCI formats associated with one data TB and on a DCI format scheduling PDSCH having a same size as a DCI format scheduling PUSCH.

Table 1 provides IEs for a DCI format scheduling a PUSCH for a maximum of one data TB.

TABLE 1

| IEs of a DCI Format Scheduling PUSCH (DCI Format 0) | |
|---|---|
| IE | Number of Bits |
| Differentiation Flag for 0/1A | 1 |
| RA | $\lceil \log_2(N_{RB}^{UL}(N_{RB}^{UL}+1)/2) \rceil$ |
| FH Flag | 1 |
| MCS and RV | 5 |
| NDI | 1 |
| TPC Command for PUSCH | 2 |
| CS and OCC Index $n_{DMRS}$ | 3 |
| CSI Request | 1 |
| SRS Request | 1 |
| DAI (TDD) | 0 (FDD) or 2 (TDD) |
| UL Index (TDD) | 0 (FDD) or 2 (TDD) |
| Padding Bits for 0 = 1A | 1 |
| RNTI | 16 |
| Total | 43 (FDD) or 47 (TDD) |

A differentiation flag IE indicates one of two DCI formats, DCI format 0 and DCI format 1A, having a same size. For example, a value of zero indicates DCI format 0 and a value of one indicates DCI format 1A.

A Resource Allocation (RA) IE indicates a part of an UL BW for a PUSCH transmission. A UE is allocated a number of consecutive RBs and for an UL BW including $N_{RB}^{UL}$, the possible RB allocations can be represented by $\lceil \log_2(N_{RB}^{UL}(N_{RB}^{UL}+1)/2) \rceil$ bits where ⌈·⌉ is the ceiling function which rounds a number to the next greater integer.

A Frequency Hopping (FH) flag IE indicates whether the PUSCH transmission is in a same BW or in a different BW in a second slot relative to a first slot.

A Modulation and Coding Scheme (MCS) and a Redundancy Version (RV) IE provides, through one of a first number of states, a modulation scheme (QPSK, QAM16, QAM64) and a code rate of a turbo code for a transmission of a data TB. In a case of a data TB retransmission according to a physical layer HARQ process, this RV IE provides through one of the remaining number of states the RV for an Incremental Redundancy (IR) assumed to be apply using turbo encoding assuming non-adaptive HARQ retransmissions (e.g., same MCS as the initial transmission for a same data TB).

A New Data Indicator (NDI) IE informs a UE as to whether a data TB the UE should transmit is a new one or whether the data TB corresponds to a retransmission of a previous data TB (e.g., a synchronous HARQ process is assumed for PUSCH transmissions).

A CS and OCC index IE, $n_{DMRS}$, informs a UE of a CS and OCC the UE should apply to a DMRS transmission.

A CSI request IE informs a UE whether the UE should include CSI feedback in a PUSCH transmission.

A SRS request IE informs the UE whether the UE should transmit an SRS according to a configured set of SRS transmission parameters (e.g., the other state indicates no SRS transmission). The SRS transmission parameters include the SRS transmission BW, the CS of the respective ZC sequence, the starting BW position of the transmission, and so on.

For a TDD system, two more IEs are included in DCI formats scheduling PUSCH transmissions. A first IE is a Downlink Assignment Index (DAI) IE informing a UE of a number of PDSCH transmissions to the UE within a bundling window which is defined as a number of DL subframes for which a UE provides HARQ-ACK feedback to a NodeB in a same UL subframe. Based on the DAI value, a UE determines a number of HARQ-ACK bits, if any, the UE includes in a PUSCH transmission. A second IE is an UL index IE which informs a UE of an UL subframe for a PUSCH transmission. This is applicable to TDD configurations of UL-DL subframes having more UL subframes than DL subframes. The partitioning of UL-DL subframes is periodic per frame and a frame may include, for example, 10 subframes.

Finally, padding bits may be included in DCI format 0, if applicable, in order to make its size equal to that of DCI format 1A.

Table 2 provides IEs for a DCI format scheduling a PDSCH for a maximum of one data TB.

TABLE 2

| IEs of a DCI Format Scheduling PUSCH (DCI Format) | |
| --- | --- |
| IE | Number of Bits |
| Differentiation Flag for 0/1A | 1 |
| RA | $\lceil \log_2 (N_{RB}^{DL} (N_{RB}^{DL} + 1)/2) \rceil$ |
| Distributed/Localized Transmission (FH) Flag | 1 |
| MCS | 5 |
| NDI | 1 |
| RV | 2 |
| HARQ Process Number | 3 (FDD) or 4 (TDD) |
| TPC Command for PUCCH | 2 |

TABLE 2-continued

| IEs of a DCI Format Scheduling PUSCH (DCI Format) | |
| --- | --- |
| IE | Number of Bits |
| SRS Request | 1 |
| DAI (TDD) | 0 (FDD) or 2 (TDD) |
| Padding Bits for 0 = 1A | 0 |
| RNTI | 16 |
| Total (FDD) | 43 |

The functionality and size of a differentiation flag IE, a RA flag IE, a distributed/localized flag IE, an MCS IE, a NDI IE, and a SRS IE are same as for DCI format 0, and this also holds for the padding bits. Asynchronous HARQ is assumed for PDSCH transmissions and a RV is provided by a separate IE while an MCS IE provides only MCS information.

A HARQ process number IE is included in DCI formats scheduling PDSCH transmissions to support an asynchronous HARQ process.

A Transmit Power Control (TPC) command IE provides a TPC command for a UE to adjust a power of an HARQ-ACK signal transmitted in a PUCCH in response to a PDSCH reception by a UE.

A DAI IE provides a counter for a number of PDSCH transmissions to a UE in a bundling window. Using a DAI IE, a UE can identify missed PDSCH receptions, due to respective missed PDCCH detections within a bundling window, unless a UE does not detect a PDCCH in any subsequent subframe after one or more subframes of missed PDCCHs.

UEs may be able to communicate over an entire system BW and with large data TB Sizes (TBS) or over only a part of a system BW and with limited data TBS. In the former case, UEs can benefit from most or all capabilities of a network for PDSCH receptions or PUSCH transmissions, are typically used by humans, and will be referred to as conventional UEs. In the latter case, UEs have substantially reduced capabilities compared to UEs according to related art in order to substantially reduce their cost, are typically associated with machines, and will be referred to as Machine Type Communication (MTC) UEs.

MTC UEs are low cost devices targeting various low data rate traffic applications including smart metering, intelligent transport systems, consumer electronics, and medical devices. Typical traffic patterns from MTC UEs are characterized by low duty cycles and small data packets (e.g., small TBS) in the order of a few tens or a few hundred bytes. MTC UEs are typically low mobility but high mobility UEs, such as for example motor vehicles, also exist. Also, unlike UEs according to the related art, MTC UEs generate more UL traffic than DL traffic and a majority of DL traffic is higher layer control information for configuration.

Unlike UEs according to the related art, such as for example a smart-phone, which may have many features, MTC UEs may have only a minimum of necessary features. Accordingly, the modem becomes the primary contributor to the cost of an MTC UE. Therefore, main cost drivers for MTC UEs are the Radio Frequency (RF) components and the Digital Base-Band (DBB) components mainly for the receiver. The RF components include a power amplifier, filters, a transceiver radio chains, and possibly a duplexer (for full duplex FDD operation). The DBB components of a UE receiver include a channel estimator, a channel equalizer, a PDCCH decoder, a PDSCH decoder, and a subframe buffer. For example, a channel estimator may be based on a Minimum Mean Square Error (MMSE) estimator, a channel equalizer may be an FFT, a PDCCH decoder may be a decoder for a TBCC, and a data decoder may be a decoder for a Turbo Code (TC).

RF costs are related to implementation and production methods as well as to design choices. For example, considering economies of scale, it may be more cost effective to use a same amplifier for conventional UEs and for MTC UEs (e.g., this will also ensure the same UL coverage) while a number of transmitter antennas for MTC UEs may be limited to one.

DBB costs are related to the communication capabilities of MTC UEs and are dominated by the receiver complexity which is typically about an order of magnitude larger than the transmitter complexity. As channel estimator complexity, FFT complexity, and subframe buffering requirements are directly associated to a reception BW, DL transmissions to MTC UEs may be over a smaller BW, at least in the DBB, than DL transmissions to conventional UEs. For example, DL transmissions to MTC UEs may be over a 1.4 MHz BW at the DBB while DL transmissions to conventional UEs may be over a 20 MHz BW.

A complexity of a PDCCH decoder depends on a number of decoding operations an MTC UE performs per subframe. As MTC UEs do not need to support a same number of TMs as conventional UEs, for example MTC UEs may not need to support spatial multiplexing for PDSCH receptions or PUSCH transmissions, a maximum number of decoding operations an MTC UE needs to perform per subframe can be significantly smaller than that for a conventional UE. A complexity of a PDSCH decoder depends on a maximum supportable TBS. Allowing for a relatively small maximum TBS for MTC UEs limits an associated decoder complexity.

MTC UEs are assumed to access a communication system in a same manner as conventional UEs. Synchronization signals are first acquired to establish synchronization with a NodeB followed by a detection of a Broadcast CHannel (BCH) that conveys essential information for subsequent communication between a NodeB and UEs (e.g., conventional UEs or MTC UEs). Regardless of a DL BW of a communication system, synchronization signals and BCH are assumed to be transmitted over a minimum DL BW located in the center of a DL BW of a communication system, such as for example in a middle six RBs of a DL BW, and over a number of Orthogonal Frequency Division Multiplexing (OFDM) symbols in a subframe. After establishing communication with a NodeB, a different part of a DL BW may be allocated to an MTC UE.

One aspect of supporting communication for MTC UEs is a design of DCI formats scheduling PDSCH transmissions to or PUSCH transmissions from MTC UEs. Respective TMs and a number of decoding operations for PDCCHs carrying respective DCI formats should be defined with an objective of minimizing DBB complexity while providing desired functionalities. It is desirable for MTC UEs to perform a smaller number of decoding operations than conventional UEs without impacting an associated scheduling efficiency and functionality.

Another aspect is a reduction in a PDCCH overhead associated with scheduling PDSCH transmissions to or PUSCH transmissions from MTC UEs. As TBS conveyed to or from MTC UEs can be significantly smaller than TBS conveyed to or from conventional UEs, similar reductions in a PDCCH overhead are needed for efficient operation of a communication system.

Finally, as communication with MTC UEs is typically UL intensive and a DBB receiver complexity is significantly larger than a DBB transmitter complexity, a more efficient coding method can be used for data transmission from MTC UEs in a PUSCH than for data transmission to MTC UEs in a PDSCH.

Therefore, there is a need to design transmissions modes and respective DCI formats associated with PDSCH transmissions to or PUSCH transmissions from MTC UEs.

There is another need to reduce a PDCCH overhead associated with scheduling PDSCH transmissions to or PUSCH transmissions from MTC UEs.

In addition, there is another need to define different coding methods for data transmitted to an MTC UE than for data transmitted from an MTC UE.

Therefore, a need exists for an apparatus, system, and method for designing transmissions modes and respective DL Control Information (DCI) formats associated with PDSCH transmissions to MTC UEs or PUSCH transmissions from MTC UEs, reducing a PDCCH overhead associated with scheduling PDSCH transmissions to MTC UEs or PUSCH transmissions from MTC UEs, and defining different coding methods for data transmitted to an MTC UE than for data transmitted from an MTC UE The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and or disadvantages and to provide at least the advantages described below. Accordingly, an aspect of the present invention is to provide methods and apparatuses to design transmissions modes and respective DL Control Information (DCI) formats associated with PDSCH transmissions to MTC UEs or PUSCH transmissions from MTC UEs, reduce a PDCCH overhead associated with scheduling PDSCH transmissions to MTC UEs or PUSCH transmissions from MTC UEs, and to define different coding methods for data transmitted to an MTC UE than for data transmitted from an MTC UE.

In accordance with another aspect of the present invention, a method for a base station to schedule a conventional UE to transmit a first PUSCH and an MTC UE to transmit a second PUSCH. The method includes transmitting a first DCI format to the conventional UE informing of a first set of IEs including a first HARQ process number IE represented by a first number of bits and transmitting a second DCI format to the MTC UE informing of a second set of IEs including a second HARQ process number IE represented by a second number of bits, wherein the second number of bits is smaller than the first number of bits. The first set of IEs can further include a CS and OCC IE represented by a first number of bits and indicating transmission parameters for a reference signal in the first PUSCH and the second set of IEs can further include a CS and OCC IE represented by a second number of bits and indicating transmission parameters for a reference signal in the second PUSCH, wherein the second number of bits is smaller than the first number of bits. The first set of IEs can further includes a FH IE represented by one bit and indicating whether or not the first PUSCH transmission is at a same part of a BW or at different parts of a BW during a UL TTI and the second set of IEs does not include a FH IE.

In accordance with another aspect of the present invention, a method for a base station to schedule a conventional UE to receive a first PDSCH and an MTC UE to receive a second PDSCH is provided. The method includes transmitting a DCI format to the conventional UE informing of a first set of IEs including a first HARQ process number IE represented by a first number of bits and transmitting a second DCI format to the MTC UE informing of a second set of IEs including a second HARQ process number IE represented by a second number of bits, wherein the second number of bits is smaller than the first number of bits including being equal to zero. The first set of IEs can further include a Redundancy Version (RV) IE represented by a first number of bits and indicating a RV for a retransmission of a data TB using IR and the second set of IEs does not include a RV IE. The first set of IEs can further include a SRS request IE represented by one bit and the second set of IEs can further include a SRS request IE represented by more than one bit and indicating whether or not the second UE transmits a SRS using a set of transmission parameters from more than one configured sets of transmission parameters. The first set of IEs can further include a RA IE indicating a transmission BW with granularity of one RB and the second set of IEs can include a RA IE indicating a transmission BW with granularity of a fraction of a RB. The first set of IEs can further include a DAI IE informing the first UE of a number of PDSCH transmissions within a number of DL TTIs and the second set of IEs does not include a DAI IE. The first DCI format can be one of two different DCI formats corresponding to two different TMs for the first PDSCH and the second DCI format is fixed for a respective fixed TM for the second PDSCH.

In accordance with another aspect of the present invention, a method for an MTC UE to transmit a PUSCH or receives a PDSCH is provided. The method includes detecting a first DCI format or by detecting a second DCI format wherein the first DCI format includes CRC bits that are scrambled by a first RNTI assigned to the MTC UE by a base station and the second DCI format includes CRC bits that are scrambled by a second RNTI assigned to the MTC UE by the base station, and wherein the first DCI format has a same size as the second DCI format. The second DCI format can further contain a bit-map of X bits, the MTC UE is assigned one of the X bits, and the MTC UE transmits a PUSCH or receives a PDSCH if the assigned bit has a predetermined value. The second DCI format further includes an IE including one bit and indicating whether it schedules a PUSCH transmission or a PDSCH reception. The MTC UE further determines a frequency resource to transmit a PUSCH or to receive a PDSCH, or further determines a resource to receive or transmit a respective HARQ-ACK signal, based on a sum of bits values located in the bit-map prior to the bit assigned to the MTC UE. The first DCI format can schedule either an initial transmission or a retransmission of a data TB and the second format can schedule only an initial transmission of a data TB.

In accordance with another aspect of the present invention, a method for an MTC UE to transmit first data in a PUSCH and receives second data in a PDSCH is provided. The method includes encoding the first data using a turbo encoder and transmitting the encoded first data in the PUSCH, and receiving the PDSCH and decoding encoded second data using a convolutional decoder to obtain the second data, wherein a maximum size of the first data is larger than a maximum size of the second data. The maximum number of frequency resources for a PUSCH transmission can be larger than a maximum number of frequency resources for a PDSCH reception.

In accordance with another aspect of the present invention, a method for a base station to schedule a first User Equipment (UE) from a first class of UEs to transmit a first Physical Uplink Shared CHannel (PUSCH) and a second UE from a second class of UEs to transmit a second PUSCH is provided. The method includes transmitting a first Downlink Control Information (DCI) format to the first UE, wherein the first DCI comprises a first set of Information Elements (IEs) including a first Hybrid Automatic Repeat reQuest (HARQ) process number IE represented by a first number of bits, and transmitting a second DCI format to the second UE, wherein the second DCI comprises a second set of IEs including a second HARQ process number IE represented by a second number of bits, wherein the second number of bits is smaller than the first number of bits.

In accordance with another aspect of the present invention, a method for a base station to schedule a first User Equipment (UE) from a first class of UEs to receive a first Physical Downlink Shared CHannel (PDSCH) and a second UE from a second class of UEs to receive a second PDSCH is provided. The method includes transmitting a first Downlink Control Information (DCI) format to the first UE, wherein the first DCI comprises a first set of Information Elements (IEs) including a first Hybrid Automatic Repeat reQuest (HARQ) process number IE represented by a first number of bits, and transmitting a second DCI format to the second UE, wherein the second DCI comprises a second set of IEs including a second HARQ process number IE represented by a second number of bits, wherein the second number of bits is smaller than the first number of bits including being equal to zero.

In accordance with another aspect of the present invention, a method for a User Equipment (UE) to transmit first data in a Physical Uplink Shared CHannel (PUSCH) and to receive second data in a Physical Downlink Shared CHannel (PDSCH) is provided. The method includes at least one of detecting by the UE a first Downlink Control Information (DCI) format and detecting a second DCI format, wherein the first DCI format includes Cyclic Redundancy Check (CRC) bits that are scrambled by a first Radio Network Temporary Identifier (RNTI) assigned to the UE by a base station and the second DCI format includes CRC bits that are scrambled by a second RNTI assigned to the UE by the base station, and wherein the first DCI format has a same size as the second DCI format, and at least one of transmitting the PUSCH and receiving the PDSCH in response to detecting at least one of the first DCI format and the second DCI format.

In accordance with another aspect of the present invention, a method for a User Equipment (UE) to transmit first data in a Physical Uplink Shared CHannel (PUSCH) and to receive second data in a Physical Downlink Shared CHannel (PDSCH). The method includes encoding the first data using a turbo encoder and transmitting the encoded first data in the PUSCH, and receiving the PDSCH and decoding encoded second data using a convolutional decoder to obtain the second data, wherein a maximum size of the first data is larger than a maximum size of the second data.

In accordance with another aspect of the present invention, a User Equipment (UE) apparatus for transmitting a Physical Uplink Shared CHannel (PUSCH) or for receiving a Physical Downlink Shared CHannel (PDSCH) is provided. The UE includes a detector for detecting at least one of a first Downlink Control Information (DCI) format and a second DCI format, wherein the first DCI format includes Cyclic Redundancy Check (CRC) bits that are scrambled by a first Radio Network Temporary Identifier (RNTI) assigned to the UE apparatus by a base station, wherein the second DCI format includes CRC bits that are scrambled by a second RNTI assigned to the UE apparatus by the base station, and wherein the first DCI format has a same size as the second DCI format, and at least one of a transmitter for transmitting the PUSCH or and a receiver for receiving the PDSCH in response to detecting the first DCI format or the second DCI format.

In accordance with another aspect of the present invention, a User Equipment (UE) apparatus for transmitting first data in a Physical Uplink Shared CHannel (PUSCH) and for receiving second data in a Physical Downlink Shared CHannel (PDSCH) is provided. The UE includes an encoder for encoding the first data using a turbo encoder, a transmitter for transmitting the encoded first data in the PUSCH, a receiver for receiving the PDSCH, and a decoder for decoding encoded second data in the received PDSCH using a convolutional decoder to obtain the second data, wherein a maximum size of the first data is larger than a maximum size of the second data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
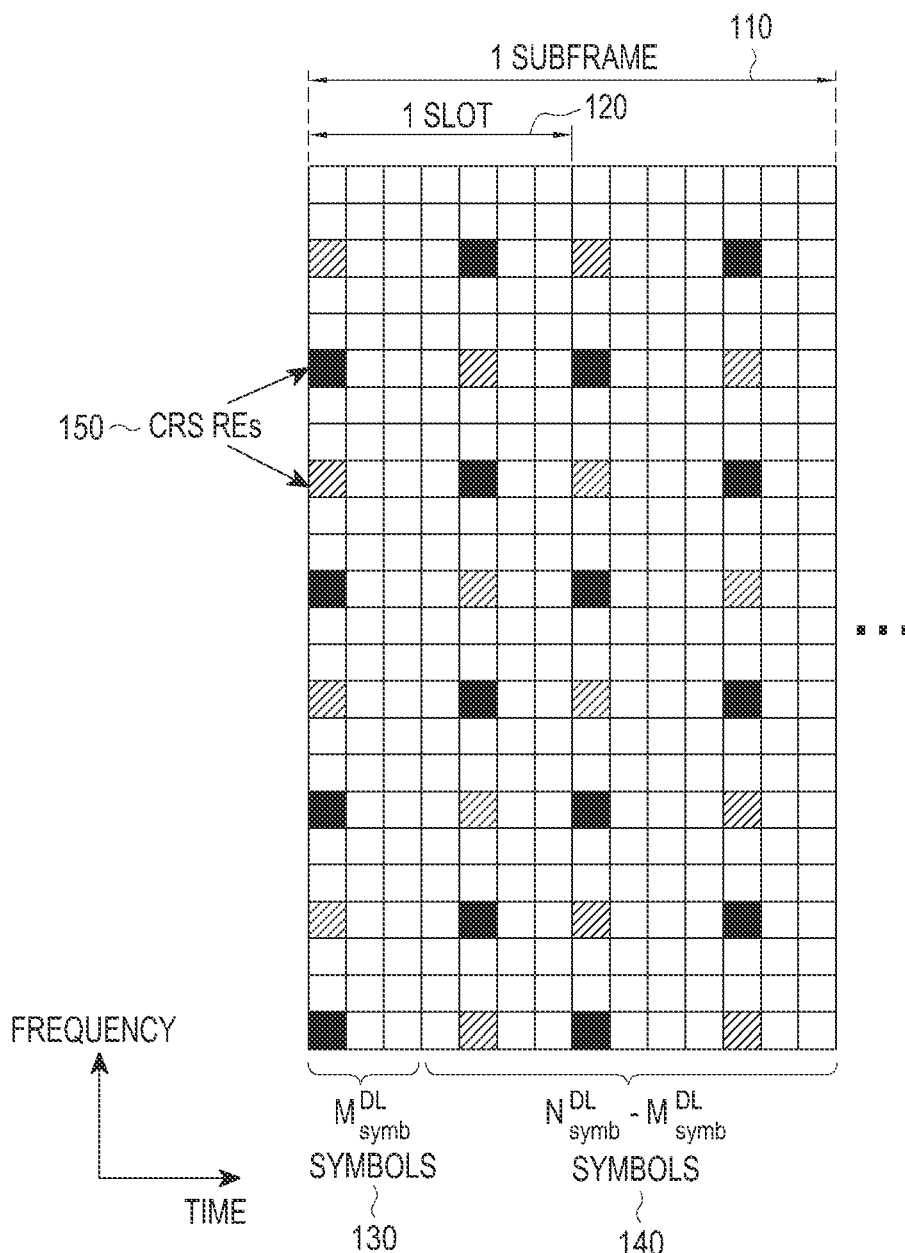
FIG. 1 is a diagram illustrating a structure for a DownLink (DL) Transmission Time Interval (TTI) according to the related art.
Figure 2:
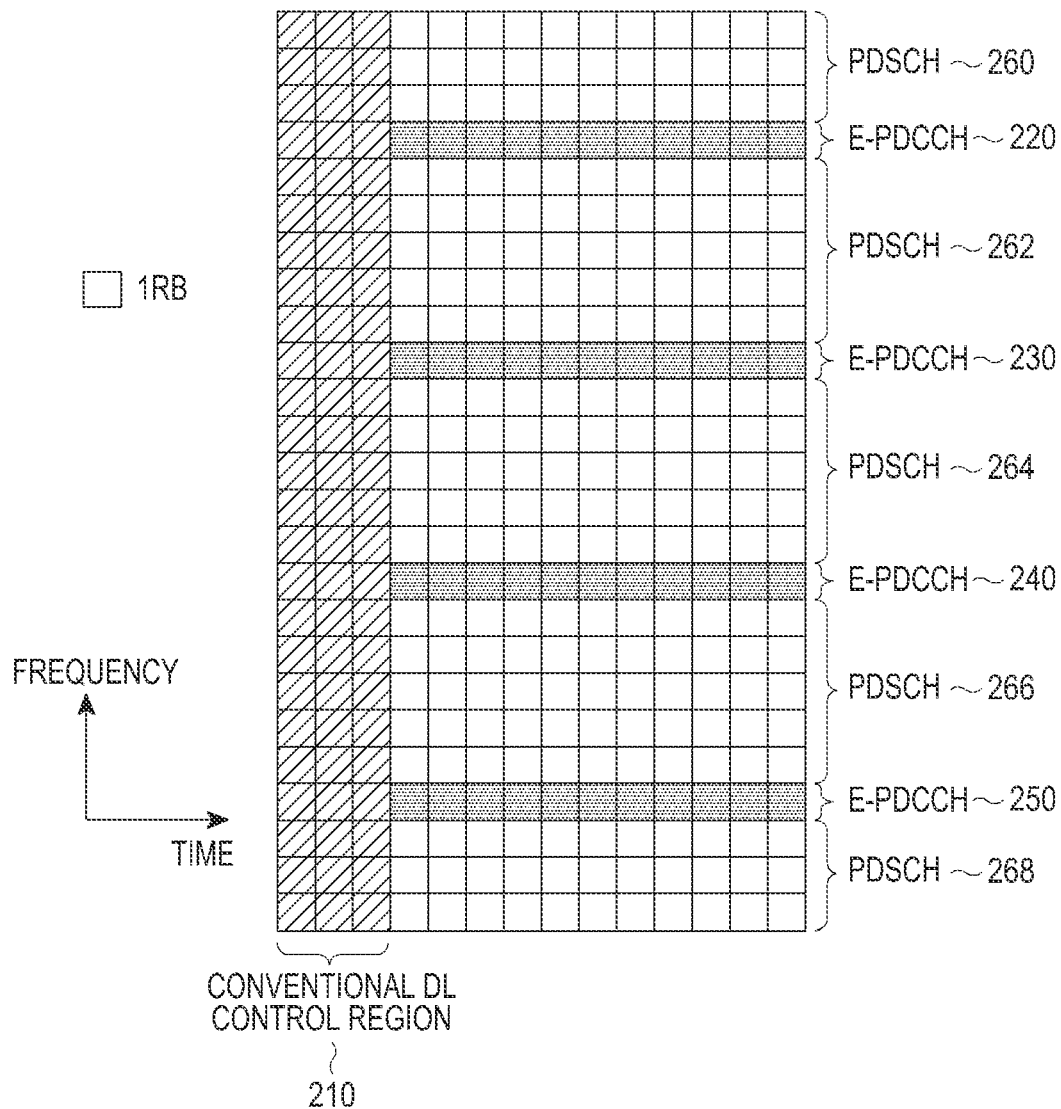
FIG. 2 is a diagram illustrating Enhanced Physical DL Control CHannel EPDCCH transmissions in a DL subframe according to the related art.
Figure 3:
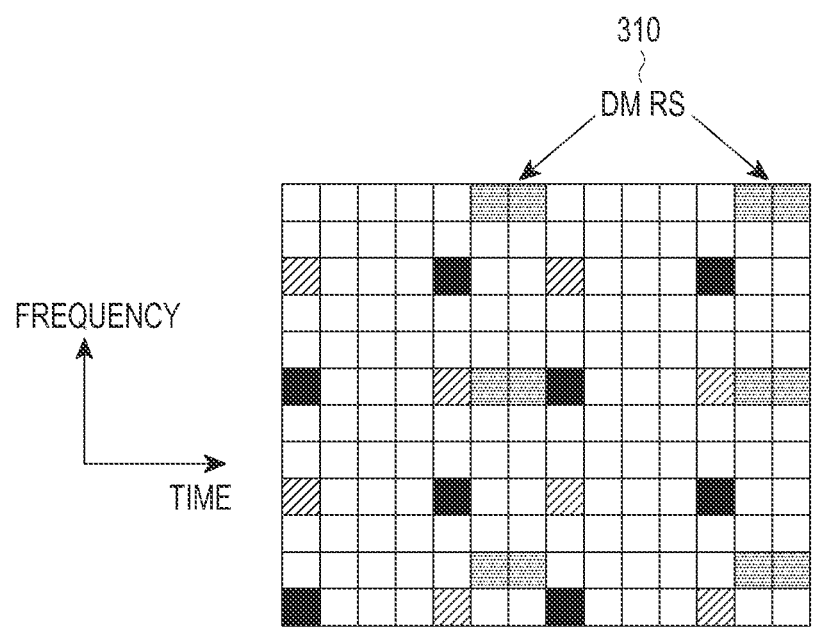
FIG. 3 is a diagram illustrating a DeModulation Reference Signal (DMRS) structure in a Resource Block RB over a DL TTI according to the related art.
Figure 4:
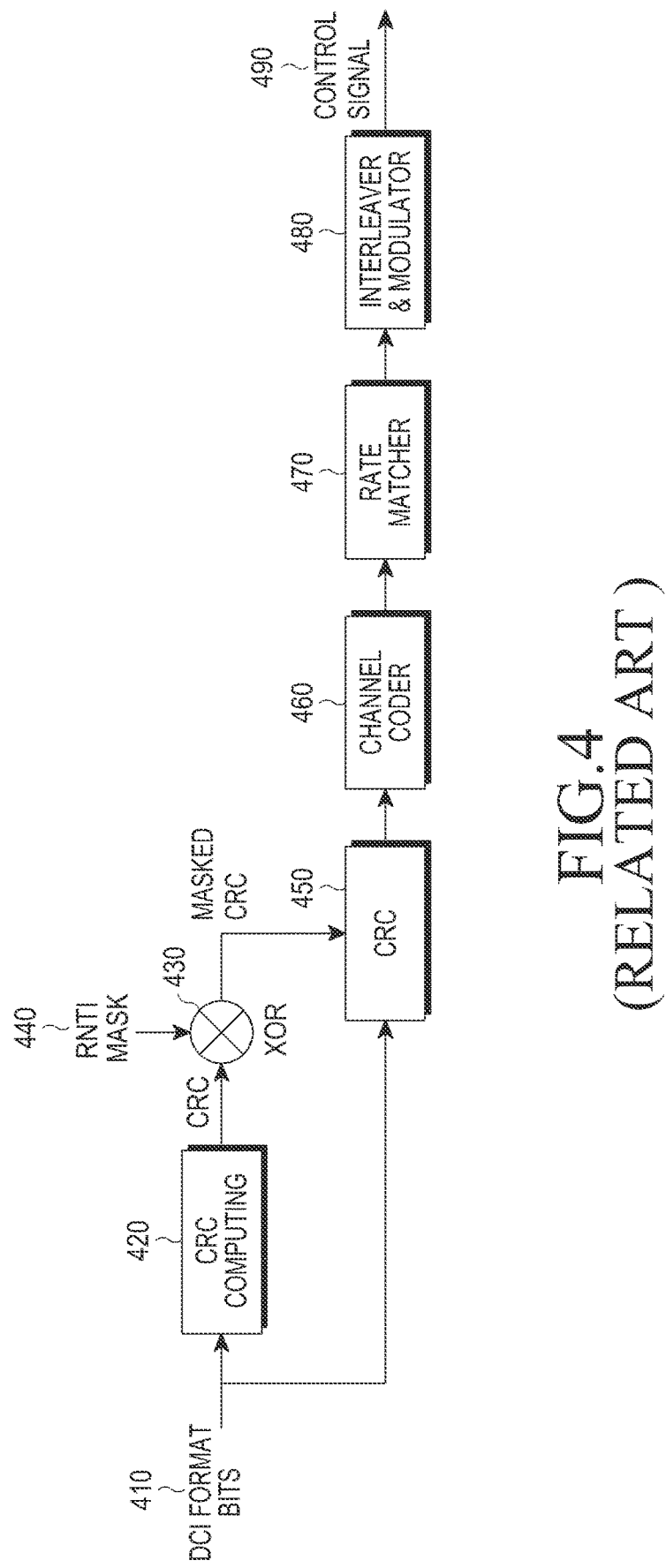
FIG. 4 is a diagram illustrating an encoding and transmission process for a DL Control Information (DCI) format according to the related art.
Figure 5:
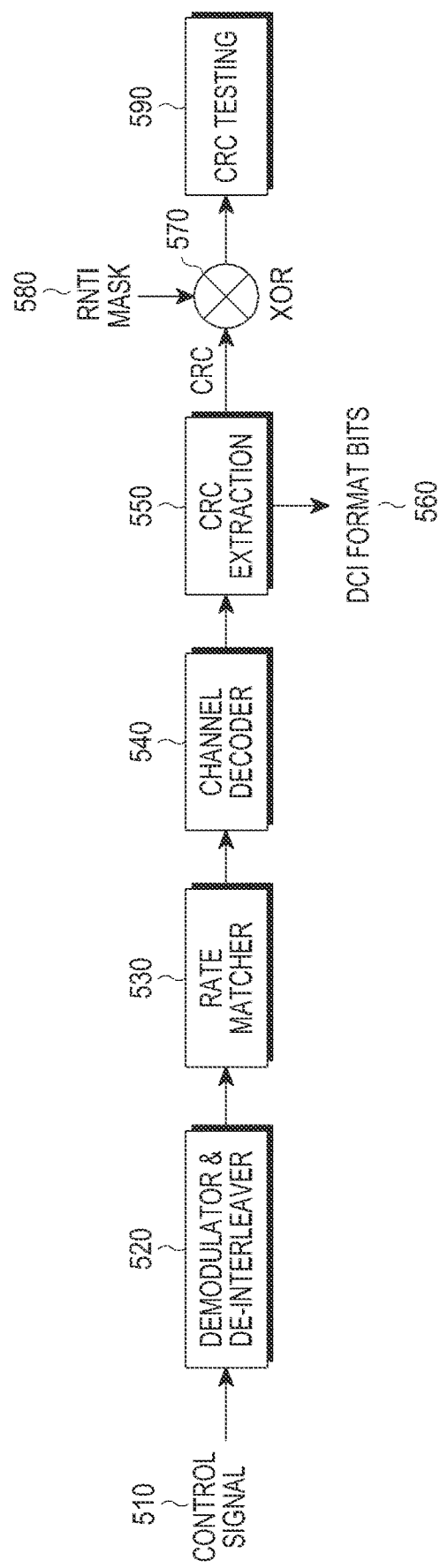
FIG. 5 is a diagram illustrating a reception and decoding process for a DCI format according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Additionally, although the exemplary embodiments of the present invention will be described with reference to Orthogonal Frequency Division Multiplexing (OFDM), exemplary embodiments of the present invention are also applicable to all Frequency Division Multiplexing (FDM) transmissions in general and to Discrete Fourier Transform (DFT)-spread OFDM in particular. Moreover, although the exemplary embodiments of the present invention will be described with reference to Physical DownLink Control CHannel (PDCCH), unless explicitly noted, exemplary embodiments of the present invention are also applicable for Enhanced Physical DownLink Control CHannel (EPDCCH).

The first exemplary embodiment of the present invention considers a design of Downlink Control Information (DCI) formats for Physical Downlink Shared CHannel (PDSCH) transmissions to and Physical Uplink Shared CHannel (PUSCH) transmissions from a Machine Type Communication (MTC) User Equipment (UE).

The first exemplary embodiment of the present invention considers modifications to DCI format 0 and DCI format 1A used for conventional UEs. The respective modified DCI formats will be referred to as DCI format 0_MTC and DCI format 1A_MTC. One design objective is to determine necessary IEs and their size in DCI format 0_MTC and DCI format 1A_MTC while considering reduced capabilities and operational characteristics of MTC UEs in order to reduce an associated PDCCH signaling overhead. Another design objective is to minimize a number of PDCCH decoding operations an MTC UE performs per subframe by designing DCI format 0_MTC and DCI format 1A_MTC to include a same number of bits.

For a design of DCI formats for MTC UEs, exemplary embodiments of the present invention incorporate principles described in the U.S. Pat. No. 8,238,297 titled "METHOD AND SYSTEM FOR DIMENSIONING SCHEDULING ASSIGNMENTS IN A COMMUNICATION SYSTEM" in which a compact DCI format 0 or a compact DCI format 1A is designed to serve a second class of UEs in a communication system in which the second class of UEs transmits PUSCH or receives PDSCH using a smaller BW or a smaller TBS than a first class of UEs.

DCI format 0_MTC incorporates attributes of smaller transmission BW or smaller TBS of a compact DCI format 0 and includes one or more additional restrictions as described below.

Table 3 describes IEs included in DCI format 0_MTC for an FDD system.

TABLE 3

| DCI Format 0_MTC for PUSCH Scheduling of an MTC | |
|---|---|
| IE | Number of Bits |
| Flag for DCI Format Differentiation | 1 |
| RA | $\lceil \log_2 (N_{RB\_MTC}^{UL} (N_{RB\_MTC}^{UL} + 1)/2) \rceil$ |
| MCS and RV | 3 |

TABLE 3-continued

| DCI Format 0_MTC for PUSCH Scheduling of an MTC | |
|---|---|
| IE | Number of Bits |
| FH Flag | 0 |
| NDI | 1 |
| HARQ Process Number | 0-3 |
| TPC Command for PUSCH | 2 |
| CS and OCC Index $n_{DMRS}$ | 0-1 |
| CSI Request | 1 |
| SRS Request | 1 |
| Padding Bits for 0 = 1A | 0 |
| RNTI | 16 |
| Total (FDD) | 30-34 |

A 1-bit flag IE provides differentiation between DCI format 0_MTC and DCI format 1A MTC because, as for DCI format 0 and DCI format 1A, exemplary embodiments of the present invention consider that these two DCI formats have a same size.

An RA IE can be reduced in scope to address only a PUSCH transmission BW for an MTC UE, expressed in a number of $N_{RB\_MTC}^{UL}$ UL RBs, which can be smaller than a PUSCH transmission BW for a conventional UE.

An MCS and RV IE can be reduced from 5 bits to, for example, 3 bits as an MCS corresponding to QAM16 or QAM64 may not be supported by MTC UEs or as an MCS granularity can be smaller than for conventional UEs. Moreover, the RV may be always assumed to be zero as, for HARQ retransmissions of a data TB, if such retransmissions are supported by the physical layer, IR has similar performance with chase combining for small data TBs.

Figure 6:
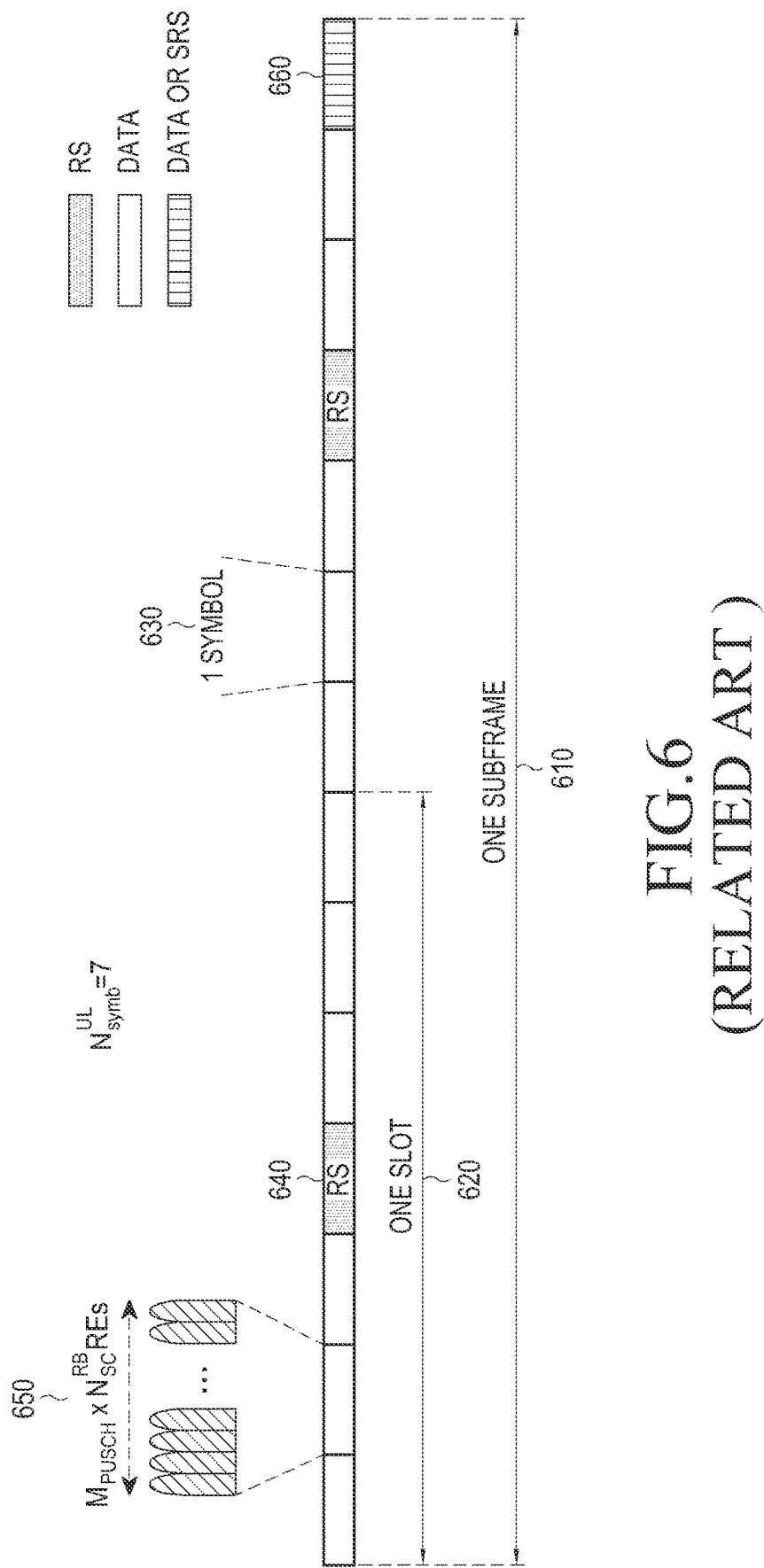
FIG. 6 is a diagram illustrating a Physical Uplink Shared CHannel (PUSCH) transmission structure over an UpLink (UL) TTI according to the related art.
Figure 7:
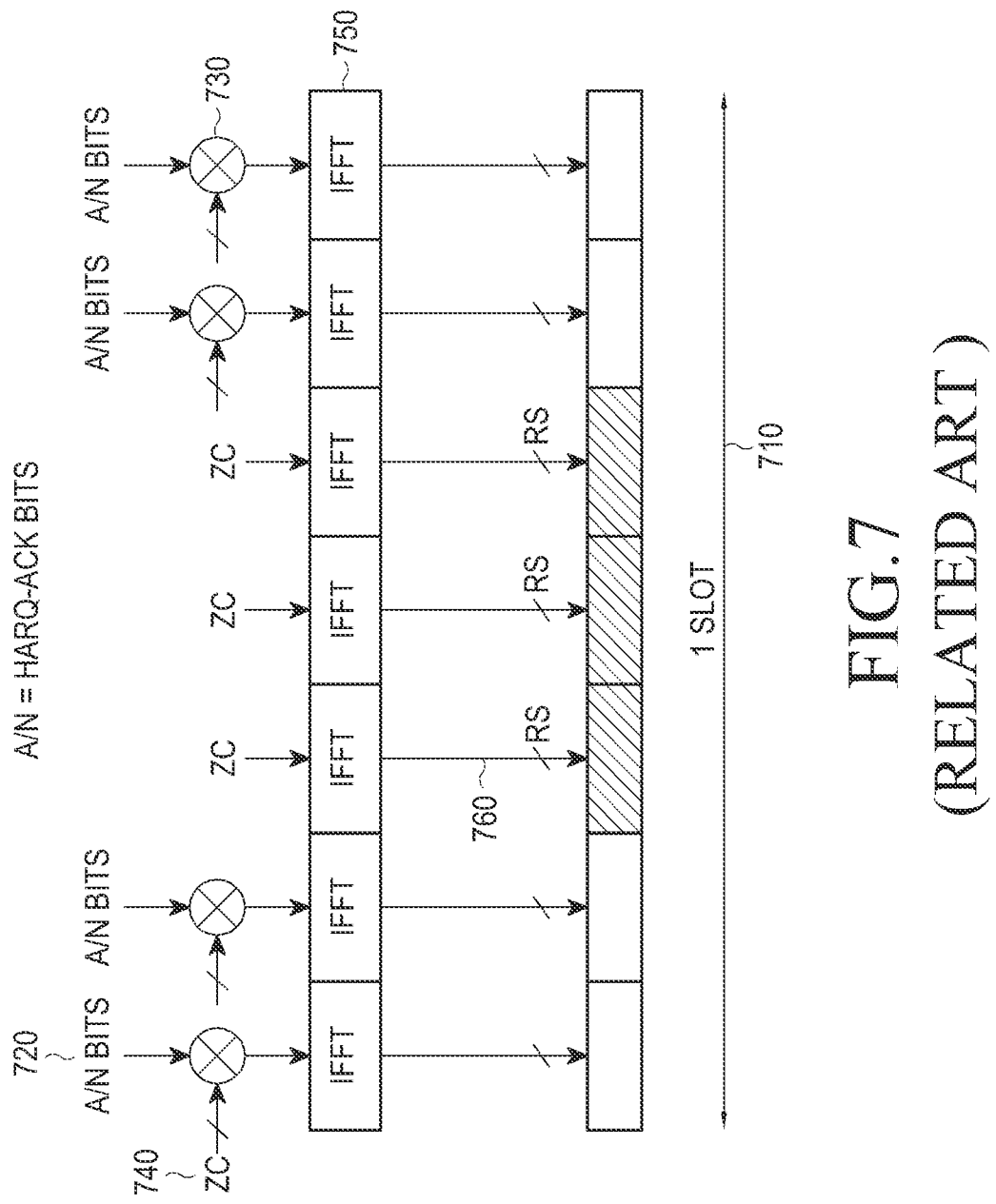
FIG. 7 is a diagram illustrating a Physical Uplink Control CHannel (PUCCH) structure for Hybrid Automatic Repeat reQuest-ACKnowledgment (HARQ-ACK) signal transmission according to the related art.
Figure 8:
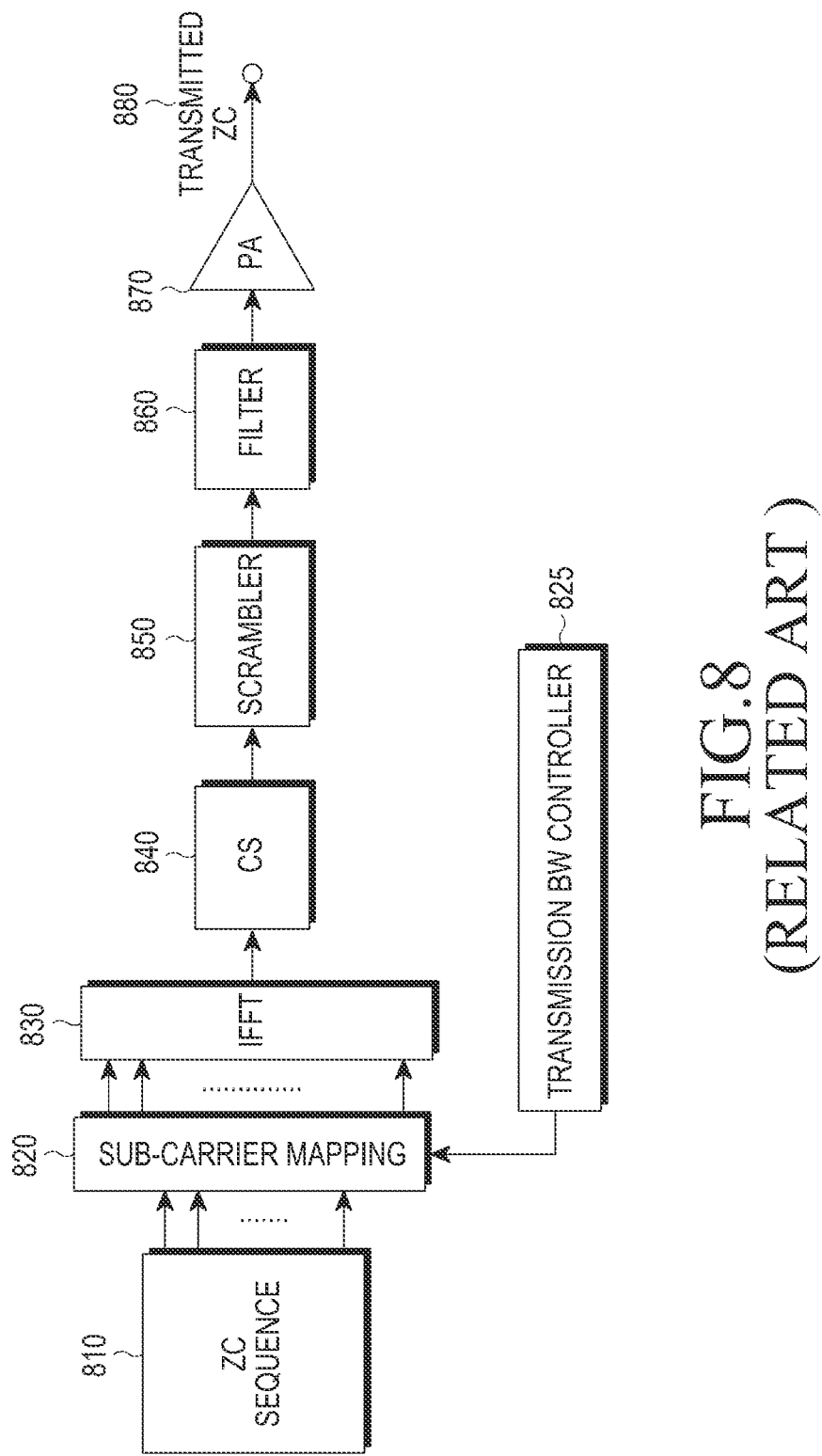
FIG. 8 is a diagram illustrating a transmitter for a Zadoff-Chu (ZC) sequence according to the related art.
Figure 9:
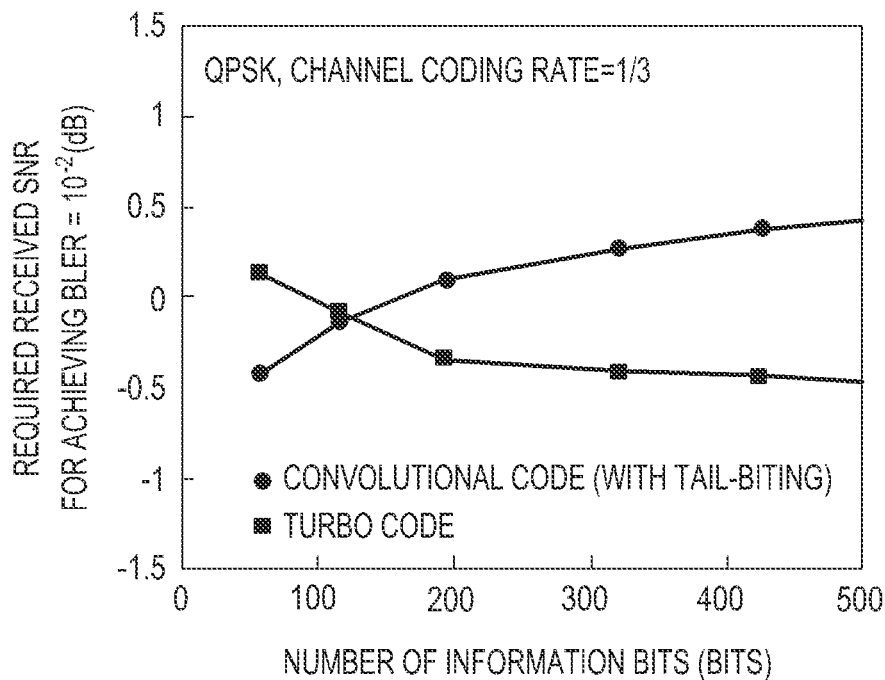
FIG. 9 is a diagram providing a detection performance for a Tail-Biting Convolutional Code (TBCC) and for a turbo code according to the related art.

A FH flag IE can be removed from DCI format 0_MTC because, if a small UL BW is used by MTC UEs, a performance difference between a format having an FH and a format having no FH for PUSCH transmissions will be small. A PUSCH transmission type (e.g., with or without FH) can be a default operational characteristic or the PUSCH transmission type can be configured to an MTC UE by higher layer signaling. For example, if a frequency diversity offered by FH is small, a PUSCH transmission can be made without FH to obtain better channel estimation from possible DMRS averaging across slots of a PUSCH subframe as illustrated in FIG. 6. Also, as MTC UEs typically have low mobility, higher layer signaling may be used to configure whether FH is used or not for a PUSCH transmission.

A HARQ process number IE can be included if multiple HARQ processes are supported for PUSCH transmissions from MTC_UEs. If so, a number of HARQ processes for MTC UEs may be smaller than for conventional UEs, in order to reduce buffering requirements and therefore reduce Digital Base-Band (DBB) complexity, and can be represented with a smaller number of bits for MTC UEs, such as 2 bits for 4 HARQ processes, than for conventional UEs (e.g., 3 bits for 8 HARQ processes).

A CS and OCC index IE, $n_{DMRS}$, can be either removed from DCI format 0_MTC or be reduced in scope. The CS and OCC index IE, $n_{DMRS}$, can be either removed from DCI format 0_MTC or be reduced in scope because if a PUSCH transmission BW includes only a few RBs, using spatial multiplexing for PUSCH transmissions from different MTC UEs does not provide meaningful UL throughput gains and therefore a large range for $n_{DMRS}$ to index a PHICH resource in response to each PUSCH transmission is not needed.

Therefore, $n_{DMRS}$ may be either omitted or $n_{DMRS}$ may be represented by a single bit rather than 3 bits as conventional UEs use. If $n_{DMRS}$ is omitted, a CS and OCC value for a DMRS transmission may be either configured by higher layer signaling or be set to a default value, such as CS 0 and OCC {1, 1}.

A NDI IE, a TPC command IE, a CSI request IE, and a SRS request IE, can be included in DCI format 0_MTC as in DCI format 0.

For DCI format 1A_MTC, as for DCI format 0_MTC, exemplary embodiments of the present invention consider a reduced DBB capability of an MTC UE and incorporate respective attributes while designing a same size for DCI format 1A_MTC and DCI format 0_MTC. Relative to DCI format 1A, DCI format 1A_MTC includes one or more additional restrictions as they are subsequently described.

Table 4 describes IEs included in DCI format 1A_MTC for a Frequency Division Duplex (FDD) system.

TABLE 4

DCI Format 1A_MTC for
PDSCH Scheduling of an MTC

| IE | Number of Bits |
| --- | --- |
| Flag for 0_MTC/1A_MTC | 1 |
| RA | $\lceil \log_2 (N_{RB\_MTC}^{DL} (N_{RB\_MTC}^{DL} + 1)/2) \rceil$ |
| MCS | 3 |
| Distributed/Localized Transmission Flag | 0 |
| NDI | 1 |
| RV | 0 |
| HARQ Process Number | 0-3 |
| TPC Command for PUCCH | 0-2 |
| CSI Request | 0-2 |
| SRS Request | 1-2 |
| Padding Bits for 0 = 1A | ≥0 |
| RNTI | 16 |
| Total | 27-35 |

A 1-bit flag IE provides differentiation between DCI format 0_MTC and DCI format 1A_MTC.

A RA IE can be reduced in scope to address only a PDSCH transmission BW for an MTC UE, expressed in a number of $N_{RB\_MTC}^{DL}$ RBs, which can be smaller than a PDSCH transmission BW for a conventional UE.

An MCS IE can be reduced from 5 bits to 3 bits as MCS corresponding to QAM16 or QAM64 modulations may not be supported by MTC UEs or an MCS granularity may be reduced relative to conventional UEs. As for DCI format 0_MTC, a subset of MCS corresponding to QPSK for a conventional UE may only be supported (a highest MCS corresponding to QPSK is always included).

A distributed or localized PDSCH transmission flag IE can be removed from DCI format 1A_MTC as, if a total available PDSCH transmission BW for MTC UEs is only a few RBs, a performance difference between the two PDSCH transmission types (e.g., distributed or localized) will be small in practice. Whether a PDSCH transmission is distributed or localized can be a default operational choice or can be configured to an MTC UE by higher layer signaling, for example depending on an MTC UE's mobility. Also, if PDSCH demodulation is based on a CRS, a PDSCH transmission can be distributed because there is no penalty to channel estimation accuracy. If PDSCH demodulation is based on DMRS, a PDSCH transmission can be localized to enable averaging of DMRS across the two slots per subframe.

A RV IE can be removed from DCI format 1A_MTC as processing of a data TB for HARQ retransmissions may be based on chase combining. Alternatively, in order to minimize buffering requirements at an MTC UE, physical layer HARQ retransmissions may not be supported.

A HARQ process number IE can be included if multiple asynchronous HARQ processes are supported for PDSCH transmissions to an MTC_UE. Otherwise, a HARQ process number IE is not included. As for PUSCH transmissions to MTC UEs, the number of HARQ processes for PDSCH transmissions can be smaller than for conventional UEs in order to reduce buffering requirements and therefore reduce DBB complexity. The HARQ process number IE can be represented with a smaller number of bits for MTC UEs, such as 2 bits for 4 HARQ processes, than for conventional UEs (3 bits for 8 HARQ processes). Moreover, a number of HARQ processes for PDSCH transmissions can be different from a number of HARQ processes for PUSCH transmissions. For example, considering asymmetric traffic requirements of MTC UEs (more UL traffic than DL traffic), more HARQ processes can be supported for PUSCH transmissions.

A TPC command IE can be maintained using 2 bits or, if HARQ-ACK signaling in a PUCCH is not supported, the TPC command IE can be completely removed.

A NDI IE and a SRS request IE can be included in DCI format 1A_MTC as in DCI format 1A.

As a DCI format 1A_MTC will be smaller than a DCI format 0_MTC, assuming at least same reductions in a number of bits for IEs common to these two DCI formats, and as it is desirable to maintain a same size for DCI format 0_MTC and DCI format 1A_MTC in order to avoid increasing a number of PDCCH decoding operations at an MTC UE, padding bits are necessary for DCI format 1A_MTC to make its size same as that of DCI format 0_MTC.

As padding bits do not carry information, the padding bits can be exchanged for additional functionality in DCI format 1A_MTC relative to DCI format 1A. For example, a CSI request IE can be included in DCI format 1A_MTC although the CSI request IE is not included in DCI format 1A. One or more PUCCH resources can be configured to an MTC UE by higher layer signaling for CSI transmission triggered by DCI format 1A_MTC. A CSI request IE value determines whether an MTC UE should report CSI and, if so, which PUCCH resource to use for a respective transmission. A SRS request may also be expanded from one bit to two bits in order to provide more flexibility for resources, such as a CS or a BW location, used by a SRS transmission.

Unlike DCI format 1A which is associated with PDSCH demodulation using a CRS, DCI format 1A_MTC may also support PDSCH demodulation using a DMRS if a DL operation for an MTC UE is DMRS based.

As a TBS for MTC UEs can be as small as a few tens of bits, a BW granularity of one RB for PDSCH transmissions to an MTC UE or for PUSCH transmissions from an MTC UE may be too large. Reducing a BW granularity to half RB can improve PDSCH or PUSCH spectral efficiency by better aligning a TBS to allocated resources. A half RB granularity can be accommodated by DCI format 0_MTC and DCI format 1A_MTC by simply setting $N_{RB\_MTC}^{UL} = 2 \cdot N_{RB\_MTC}^{UL}$ in Table 3 and $N_{RB\_MTC}^{DL} = 2 \cdot N_{RB\_MTC}^{DL}$ in Table 4.

Although DCI format 0_MTC in Table 3 and DCI format 1A_MTC in Table 4 assume an FDD system, the same IEs are also applicable for a TDD system. Regarding the two additional IEs of DCI formats for conventional UEs in TDD systems, namely the Downlink Assignment Index (DAI) IE and the UL index IE, their necessity for MTC UEs can be reconsidered. As communication with MTC UEs is typically more UL than DL intensive, PUSCH transmissions from MTC UEs are more frequent than PDSCH transmissions to MTC UEs that usually provide higher layer control signaling information. Therefore, MTC UEs do not typically require multiple PDSCH transmissions within a bundling window and a DAI IE may be omitted from DCI format 0_MTC and DCI format 1A_MTC. The conventional UL index IE should be included in DCI format 0_MTC as TDD UL-DL configurations aiming to primarily support MTC UEs may have more UL subframes than DL subframes per frame. Two additional padding bits can be included in DCI format 1A_MTC to maintain a same size with DCI format 0_MTC when an UL index IE of 2 bits is included in DCI format 0_MTC.

A number of PDCCH decoding operations an MTC UE performs for each Control Channel Element (CCE) AL can be configured by a NodeB through higher layer signaling. Alternatively, or prior to a configuration by higher layer signaling, a fixed number of PDCCH decoding operations for respective CCE ALs can be supported in order to enable detection of a DCI format scheduling PDSCH before any higher layer signaling can be provided. For example, an MTC UE may perform 2 decoding operations for AL of 4 CCEs and 2 decoding operations for AL of 8 CCEs to detect a DCI format in a PDCCH that schedules a PDSCH with configuration information after the MTC UE performs initial system access. Additionally, as communication with MTC UEs is more UL than DL intensive, if a size of a DCI format scheduling PUSCH is different than a size of a DCI format scheduling PDSCH then, unlike conventional UEs, an MTC UE may perform a larger number of decoding operations for DCI formats scheduling PUSCH than for DCI formats scheduling PDSCH.

Figure 10:
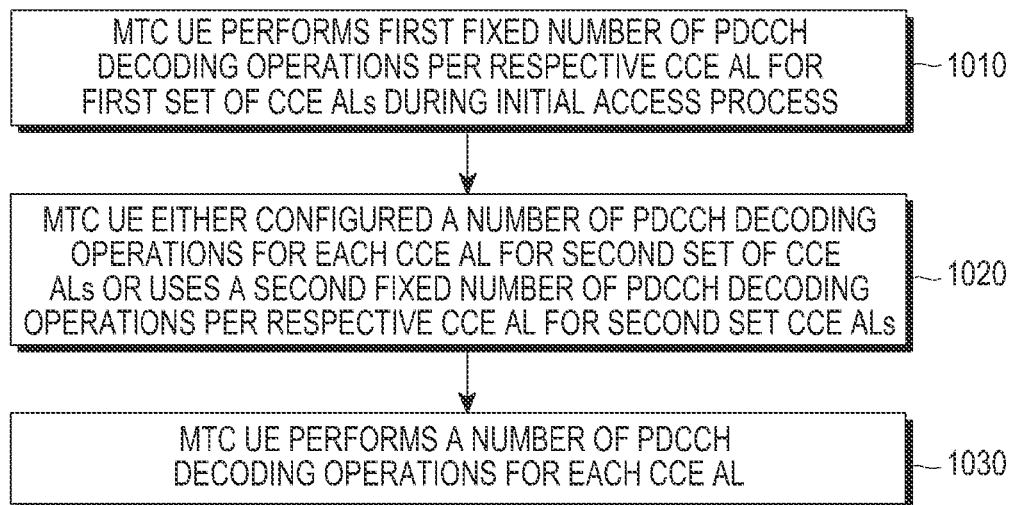
FIG. 10 is a diagram illustrating decoding operations at a Machine Type Communication (MTC) User Equipment (UE) according to an exemplary embodiment of the present invention.

FIG. 10 is a diagram illustrating decoding operations at an MTC UE according to an exemplary embodiment of the present invention.

Referring to FIG. 10, during an initial access process to a NodeB, an MTC UE performs a first fixed number of PDCCH decoding operations per respective CCE AL for a first set of CCE ALs in step 1010. For example, the MTC UE performs a first fixed number of PDCCH decoding operations per respective CCE AL for a first set of CCE ALs as specified in the operation of the communication system. After detecting a PDCCH scheduling a PDSCH conveying configuration information as part of the initial access process, in step 1020 the MTC UE is either configured by a NodeB a number of PDCCH decoding operations for each CCE AL for a second set of CCE ALs or uses a second fixed number of PDCCH decoding operations per respective CCE AL for a second set CCE ALs which can be different than the PDCCH decoding operations used during the initial access process. The second fixed number of PDCCH decoding operations per respective CCE AL and the second set CCE ALs can also be different relative to respective ones for conventional UEs while the first fixed number of PDCCH decoding operations per respective CCE AL and the first set CCE ALs can be same for MTC UEs and conventional UEs. An MTC UE subsequently performs a number of decoding operations for each CCE AL in step 1030.

Unlike a conventional UE which is assumed to decode at least a DL TM dependent DCI format having a different size than DCI format 0/1A, communication with an MTC UE can be based only on DCI format 0_MTC and DCI format 1A_MTC having a same size. Consequently, an MTC UE performs at most half a number of PDCCH decoding operations that a conventional UE performs.

As Digital Base-Band (DBB) complexity is dominated by the receiver and as communication with MTC UEs is more UL than DL intensive, PUSCH transmissions from MTC UEs may be over a larger BW than PDSCH transmissions to MTC UEs. As a result, having a same size for DCI formats 0_MTC and 1A_MTC is practically not possible without imposing additional restrictions to a RA IE of DCI format 0_MTC. In this case, exemplary embodiment of the present invention considers that a resource unit in DCI format 0_MTC can be different than a resource unit in DCI format 1A_MTC. For example, if a total available UL BW is 25 RBs and a total available DL BW is 6 RBs, a same size for a RA IE can be achieved if a resource unit in DCI format 0_MTC is 4 RBs (for a maximum UL resource allocation of 24 RBs) and a resource unit in DCI format 1A_MTC is 1 RB.

Figure 11:
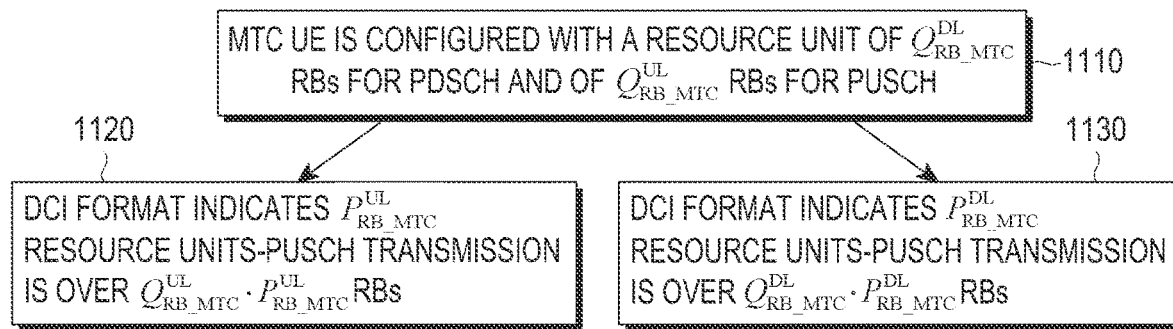
FIG. 11 is a diagram illustrating an interpretation of a Resource Allocation (RA) Information Element (IE) in DCI format 0_MTC and DCI format 1A_MTC based on a configuration of a resource granularity according to an exemplary embodiment of the present invention.

FIG. 11 is a diagram illustrating an interpretation of a Resource Allocation (RA) IE in DCI format 0_MTC and DCI format 1A_MTC based on a configuration of a resource granularity according to an exemplary embodiment of the present invention.

Referring to FIG. 11, in step 1110, an MTC UE is configured by a NodeB through higher layer signaling a resource unit of $Q_{RB\_MTC}^{DL}$ RBs for PDSCH transmissions and of $Q_{RB\_MTC}^{UL}$ RBs for PUSCH transmissions. Upon reception of a DCI format 0_MTC indicating allocation of $P_{RB\_MTC}^{UL}$ resource units, in step 1120, an MTC UE transmits a PUSCH over $Q_{RB\_MTC}^{UL} \cdot P_{RB\_MTC}^{UL}$ RBs. Similarly, upon reception of a DCI format 1A_MTC indicating allocation of $P_{RB\_MTC}^{UL}$ resource units, in step 1130, an MTC UE transmits a PUSCH over $Q_{RB\_MTC}^{DL} \cdot P_{RB\_MTC}^{DL}$ RBs 1130. Either a DL resource unit $Q_{RB\_MTC}^{DL}$ or a UL resource unit $Q_{RB\_MTC}^{UL}$ can be a fraction of a RB or a multiple of a RB.

In addition to a capability of an MTC UE to have a PUSCH transmission BW larger than a PDSCH reception BW, a PUSCH transmission may also use a larger TBS or a higher MCS than a PDSCH transmission uses. Then, either an MCS IE in DCI format 0_MTC may have a coarser granularity than an MCE IE in DCI format 1A_MTC or one additional bit may be included in an MCS IE in DCI format 0_MTC.

The second exemplary embodiment of the present invention considers scheduling for a group of MTC UEs using a single DCI format which can schedule either PDSCH or PUSCH transmissions to or from, respectively, multiple MTC UEs.

An MTC UE can be configured both with an MTC-UE-Radio Network Temporary Identifier (RNTI) and with an MTC-group-RNTI. A size of a DCI format scheduling PDSCH or PUSCH for a group of MTC UEs is designed to be the same as a size of a DCI format scheduling PDSCH or PUSCH, respectively, for an individual MTC UE. This constraint avoids increasing a number of PDCCH decoding operations for an MTC UE due to support of group scheduling and therefore avoids increasing a respective DBB receiver complexity. In one example, in order to adapt to traffic variations, a NodeB may decide to simultaneously (re)-configure to a group of MTC UEs, by higher layer signaling in respective PDSCHs, parameters for transmissions or receptions of various signals such as UL control signals, SRS, and so on. In another example, based on a Buffer Status Report (BSR) from some MTC UEs (not necessarily in a same subframe) in a group of MTC UEs for delay non-sensitive traffic such as metering, a NodeB may perform group scheduling of respective PUSCH transmissions from a group of MTC UEs.

In order to provide efficient support for group scheduling of MTC UEs while fulfilling a constraint for a respective DCI format to have a same size as a DCI format for individual scheduling of an MTC UE (either for PDSCH or for PUSCH transmission), a DCI format for group scheduling of MTC UEs should provide less flexibility, including no flexibility, in dynamically setting values of IEs included in a DCI format scheduling an individual MTC UE.

A NodeB has freedom to determine whether to use a DCI format with CRC scrambled by an MTC-UE-RNTI or with an MTC-group-RNTI. A determination by a NodeB can be based on considerations such as a DL control overhead (e.g., group scheduling is advantageous), an optimization for spectral efficiency of each PDSCH or PUSCH transmission (e.g., individual MTC UE scheduling is advantageous), a traffic type from each MTC UE (e.g., individual scheduling is advantageous for delay sensitive traffic while group scheduling is advantageous otherwise), a BSR from each MTC UE (e.g., individual scheduling may be used if a RA size associated with group scheduling is not appropriate), and so on.

A DCI format scheduling a group of MTC UEs (UEs assigned a same MTC-group-RNTI) should also be able to identify scheduled MTC UEs as not all MTC UEs may need to receive PDSCH or transmit PUSCH. Otherwise, if an MTC UE always assumes that it is scheduled a PDSCH or a PUSCH when it receives a DCI format with an MTC-group-RNTI, a respective waste of DL or UL resources may occur in order to maintain robust system operation. Therefore, a DCI format scheduling a group of MTC UEs should include an MTC UE identification IE in a form of a bit-map indicating which MTC UEs in a group of MTC UEs are actually being scheduled. For this MTC UE identification IE, a one-to-one correspondence exists between each MTC UE, in a group of MTC UEs, and a binary element in a bit-map. This correspondence is represented by an MTC-index IE which, together with a configuration to an MTC UE for group scheduling by an MTC-group-RNTI, is informed by a NodeB to an MTC UE in advance through higher layer signaling.

Figure 12:
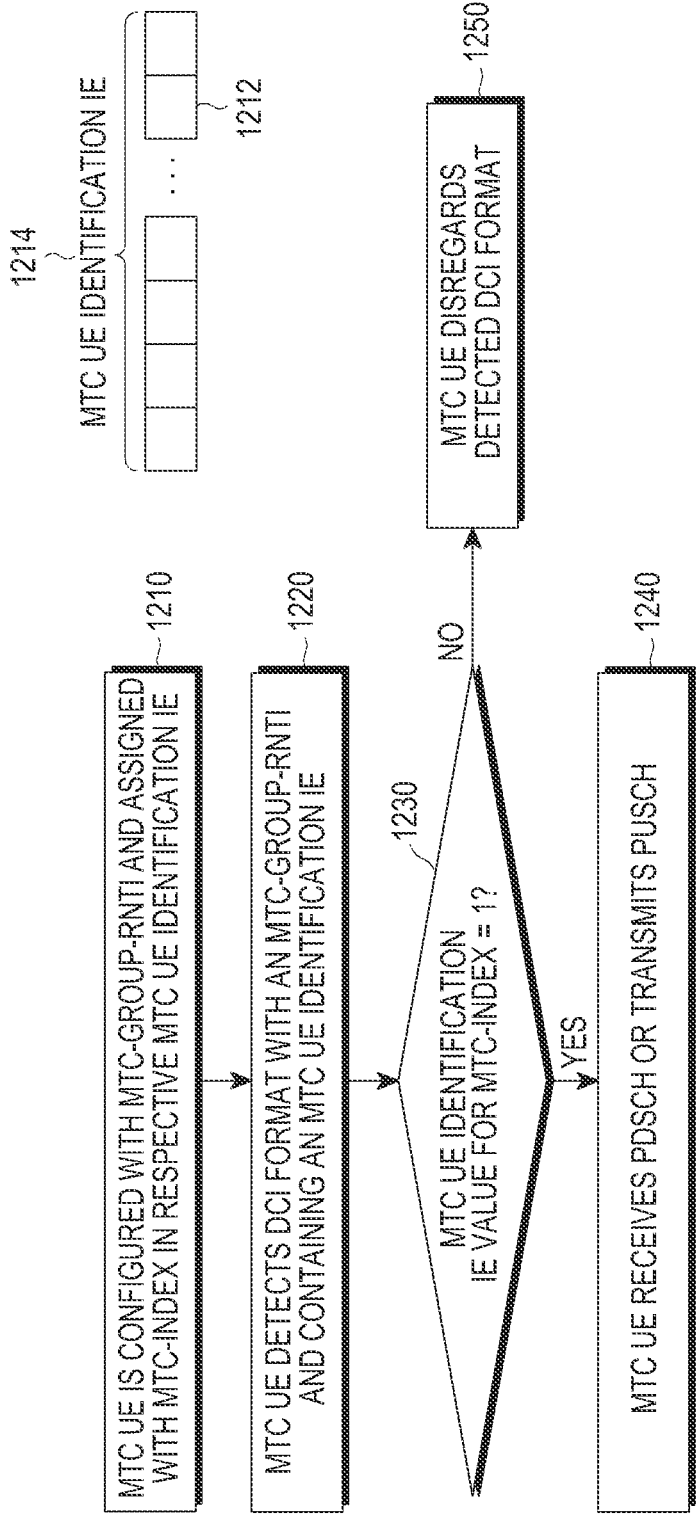
FIG. 12 is a diagram illustrating a process for group scheduling of MTC UEs according to an exemplary embodiment of the present invention.

FIG. 12 is a diagram illustrating a process for group scheduling of MTC UEs according to an exemplary embodiment of the present invention.

Referring to FIG. 12, in step 1210, a NodeB first configures an MTC UE with an MTC-group-RNTI and with a respective MTC-index 1212 in an MTC UE identification IE 1214 included in a DCI format with CRC scrambled by a respective MTC-group-RNTI. Thereafter, in step 1220, an MTC UE detects a DCI format with CRC scrambled with an MTC-group-RNTI assigned to the MTC UE. Subsequently, an MTC UE examines an MTC identification IE value in its assigned MTC-index 1230. For example, the MTC UE determines whether the MTC identification IE is set to 1. If this value is set to 1, the process proceeds to step 1240 in which an MTC UE receives PDSCH or transmits PUSCH depending on a respective type of the DCI format. Otherwise, if the value is not set to 1, the process proceeds to step 1250 in which an MTC UE disregards a DCI format.

Under an objective of having a same size for a DCI format scheduling an individual MTC UE and a DCI format scheduling a group of MTC UEs, a treatment of IEs in the former DCI format is now considered in a design of the latter DCI format.

A 1-bit DCI format differentiation flag IE indicates whether a DCI format is applicable to PDSCH group scheduling or PUSCH group scheduling. A functionality of this IE is same as for individual MTC UE scheduling with DCI format 0_MTC or DCI format 1A_MTC. An alternative is to configure a UE with a first MTC-group-RNTI for PDSCH group scheduling and with a second MTC-group-RNTI for PUSCH group scheduling or to configure a UE for only PDSCH group scheduling or for only PUSCH group scheduling.

An RA IE is not included in a DCI format scheduling a group of MTC UEs. Instead, resources allocated to each MTC UE in a group are predetermined and, although not necessary, all MTC UEs in a same group can have a same size of resources. This leads to a simpler implementation because an MTC UE in a group does not need additional explicit signaling to derive its allocated resources. A resource allocation unit $MTC_{group\_RA\text{-}unit}$ can be a multiple or a sub-multiple of a RB and can be informed to an MTC UE by a NodeB through higher layer signaling or be predetermined in the operation of a communication system. Available resources may start from a predetermined resource $MTC_{group\_RA\_first}$, which may be informed to an MTC UE by higher layer signaling or be implicitly determined, and continue in a sequential order in steps of a resource allocation unit $MTC_{group\_RA\text{-}unit}$. An MTC UE determines a starting point of its assigned $MTC_{group\_RA\text{-}unit}$ RBs for PDSCH reception or PUSCH transmission, $MTC_{RA\text{-}start}$, based on a sum of elements in an MTC UE identification IE located prior to a location (MTC-index) configured to the $MTC_{run\_sum}$, and $MTC_{RA\text{-}start} = MTC_{group\_RA\_first} + MTC_{run\_sum} \cdot MTC_{group\_RA\text{-}unit}$.

For example, for a DCI format performing PDSCH scheduling to a group of 4 MTC UEs, a first MTC UE with bit-map value (MTC-index value) of 1 may be allocated a RB with a lowest index $MTC_{group\_RA\text{-}unit}$ is 1 RB, $MTC_{group\_RA\_first}=0$, and $MTC_{run\_sum}=0$), a second MTC UE with bit-map value of 1 may be allocated a RB with a second lowest index ($MTC_{run\_sum}=1$), and so on. In a case in which E-CCHs are used, respective RBs may be excluded by MTC UEs in a determination of their respective resources and $MTC_{group\_RA\_first}$ may still be implicitly determined by excluding resources allocated to a transmission of E-CCHs.

Figure 13:
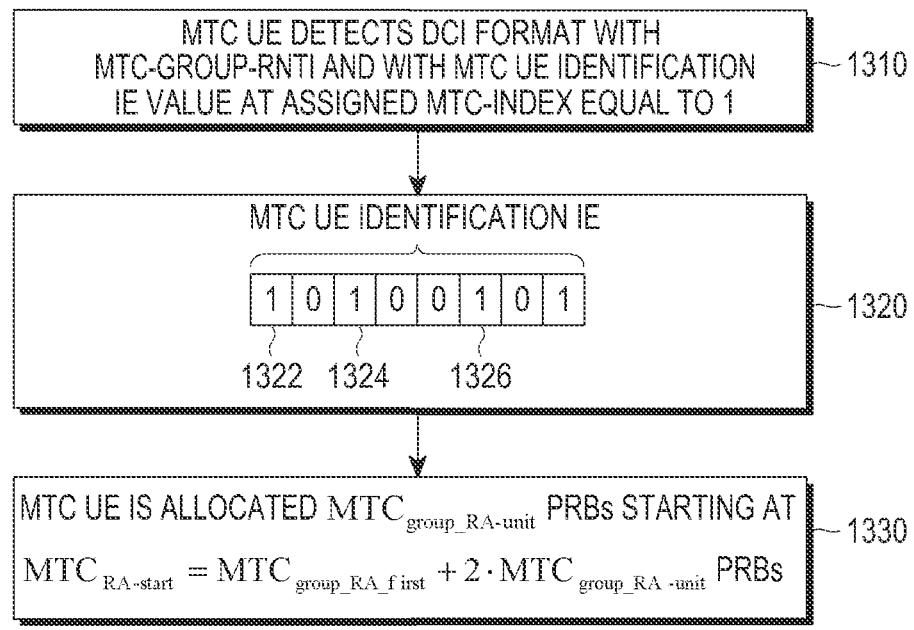
FIG. 13 is a diagram illustrating a process for an MTC UE in a group of MTC UEs to determine its assigned resources in response to detecting a DCI format with an MTC-group-Radio Network Temporary Identifier (RNTI) according to an exemplary embodiment of the present invention.

FIG. 13 is a diagram illustrating a process for an MTC UE in a group of MTC UEs to determine its assigned resources in response to detecting a DCI format with an MTC-group-RNTI according to an exemplary embodiment of the present invention.

Referring to FIG. 13, in step 1310, an MTC UE configured with an MTC-group-RNTI and with an MTC-index (location) in an MTC UE identification IE contained in a DCI format with CRC scrambled by an MTC-group-RNTI, as described in FIG. 12, detects a respective PDCCH and determines that an MTC UE identification IE value in its assigned MTC-index is equal to 1. Thereafter, in step 1320, an MTC UE also determines that an MTC UE identification IE includes 2 other values of 1, 1322 and 1324, located prior to its assigned MTC-index 1326 ($MTC_{run\_sum}=2$). Based on a signaled or predetermined resource unit $MTC_{group\_RA\text{-}unit}$, an MTC UE determines its resource for PDSCH reception or for PUSCH transmission starting at $MTC_{RA\text{-}start} = MTC_{group\_RA\_first} + 2 \cdot MTC_{group\_RA\text{-}unit}$ and with a size of $MTC_{group\_RA\text{-}unit}$ RBs in step 1330.

A transmission type IE (distributed/localized transmission IE or FH flag IE) may not be included in a DCI format scheduling a group of MTC UEs. Instead, all transmissions may have a same type which can be either predetermined in the operation of a communication system or be configured to each MTC UE in the group of MTC UEs by higher layer signaling. For example, all PDSCH transmissions may be distributed and all PUCCH transmissions may perform FH.

An MCS and RV IE for PUSCH transmission or an MCS IE for PDSCH transmission may or may not be included in a DCI format scheduling a group of MTC UEs. If an MCS and RV IE is not included, an MCS is configured to each MTC UE in a group of MTC UEs by higher layer signaling. For example, an MCS can be based on the long term SINR an MTC UE experiences in an UL channel or in a DL channel. If an MCS and RV IE is included, a number of respective bits can be reduced compared to a number of bits in a DCI format scheduling an individual MTC UE, for example from 3 to 2. At least in case of PUSCH transmissions, an RV is always zero (e.g., only initial transmissions of a TB may be supported by group scheduling as is subsequently discussed).

An NDI IE may not be included in a DCI format scheduling a group of MTC UEs and respective PDSCH or PUSCH transmissions can always be initial transmissions. A reason for not supporting group scheduling for retransmissions of an HARQ process, if such retransmissions are supported at the physical layer, is because of a much smaller likelihood that a predetermined group of MTC UEs will need such retransmissions. For example, if a DCI format schedules PDSCH transmissions to a group of MTC UEs, a retransmission will only be needed for MTC UEs that did not correctly receive an initial PDSCH transmission and, for typical PDSCH error rates, a retransmission is more likely to be needed for much fewer MTC UEs than ones having an initial transmission. A DCI format scheduling an individual MTC UE can then be used for retransmissions of an HARQ process, if such retransmissions are supported at the physical layer.

An RV IE may not be included in a DCI format scheduling a group of MTC UEs for respective PDSCH transmissions for the same reasons as for not including an NDI IE as mentioned above.

A HARQ process IE may or may not be included in a DCI format scheduling PDSCH or PUSCH transmissions to or from, respectively, a group of MTC UEs. If a HARQ process IE is not included, a HARQ process number (e.g., assuming that more than one HARQ process is supported) can be implicitly determined for example by linking a HARQ process to a subframe number (e.g., synchronous HARQ in both DL and UL).

A TPC command IE may or may not be included in a DCI format scheduling PDSCH or PUSCH transmissions to or from, respectively, a group of MTC UEs. If HARQ-ACK signaling is not supported for MTC UEs then, instead of a TPC command, a DCI format can include an MCS for PDSCH or PUSCH transmissions to or from, respectively, a group of MTC UEs. Link adaptation is then performed based on MCS adaptation instead of power adaptation (e.g., an MTC UE can assume a TPC command indicating no power adjustment).

In another alternative, a TPC command IE including 1 bit is included in a DCI format scheduling PDSCH or PUSCH transmissions to or from, respectively, a group of MTC UEs. The 1-bit TPC command IE may indicate, for example, a power adjustment of $\{-1\ 1\}$ dB instead of a power adjustment of $\{-3, -1, 0\ 1\}$ dB that can be supported by a 2-bit TPC command IE.

In another alternative, neither a TPC IE nor an MCS IE is included in a DCI format for PDSCH or PUSCH scheduling to a group of MTC UEs. In a case in which a negative TPC command would be needed, a consequence is a somewhat increased interference. In a case in which a positive TPC command would be needed, a consequence is a somewhat increased error rate.

A CS and OCC Index IE, $n_{DMRS}$, may not be included in a DCI format scheduling a group of MTC UEs for PUSCH transmissions. Instead, all MTC UEs can use a same CS and OCC which can be either predetermined, such as for example CS=0 and OCC=$\{1, 1\}$, or can be configured by higher layer signaling. A resource for PHICH transmission, if any, can be derived from a $MTC_{run\_sum}$ value for a respective UE as described below.

A CSI request IE may not be included in a DCI format scheduling PUSCH transmissions from a group of MTC UEs. As CSI feedback is associated with PDSCH scheduling, not all MTC UEs scheduled PUSCH transmissions may need to report CSI in respective PUSCHs. Alternatively, a DCI format with an MTC-UE-RNTI can be used or MTC UEs can be configured with a separate MTC-group-RNTI triggering CSI feedback using PUSCH or PUCCH and a determination of transmission parameters can be similar to that of data in a PUSCH as it was previously described.

A SRS request IE may not be included in a DCI format scheduling PDSCH transmissions to or PUSCH transmissions from a group of MTC UEs as not all MTC UEs may need to also transmit SRS. Alternatively, a DCI format with an MTC-UE-RNTI can be used or MTC UEs can be configured with a separate MTC-group-RNTI triggering SRS transmission with parameters previously configured by a NodeB through higher layer signaling for each MTC UE in a group of MTC UEs.

Therefore, a DCI format scheduling a group of MTC UEs can include only a respective MTC-group-RNTI and an MTC UE identification IE (bit-map) without including any IEs provided by a DCI format scheduling an individual MTC UE. Alternatively, a DCI format scheduling a group of MTC UEs can also include a minimal number of IEs provided by a DCI format scheduling an individual MTC UE such as an MCS IE or a TPC IE.

Table 5 provides contents for a DCI format with CRC scrambled by an MTC-group-RNTI scheduling PDSCH transmissions to or PUSCH transmissions from a group of MTC UEs under previously discussed alternatives for included IEs. A size of a DCI format scheduling a group of MTC UEs is same as a size of a DCI format scheduling an individual MTC UE and assumed to be bits.

TABLE 5

DCI Formats for Group Scheduling of MTC UEs

| IE | Group DCI Format-Option 1 | Group DCI Format-Option 2 |
| --- | --- | --- |
| Flag for DL/UL Scheduling | 1 | 1 |
| MTC UE identification | Q-17 | $\lfloor(Q-17)/(I+1)\rfloor$ |
| Additional IEs (bits per MTC UE) | — | I |
| Padding Bits | — | $Q-17-\lfloor(Q-17)/(I+1)\rfloor\cdot(I+1)$ |
| MTC-group-RNTI | 16 | 16 |
| Total | Q | Q |

If a DCI format scheduling a group of MTC UEs includes only an MTC-group-RNTI/CRC and a flag for distinguishing between PDSCH and PUSCH, a maximum number of MTC UEs in a group is Q-17. For example, for Q=29, a group may include up to 12 MTC UEs.

If a DCI format scheduling a group of MTC UEs additionally includes other IEs, such as a TPC IE or an MCS IE, corresponding to bits per MTC UE, a maximum number of MTC UEs in a group is $\lfloor(Q-17)/(I+1)\rfloor$. For example, for 2 and Q=29, a group can include up to 4 MTC UEs. A number of IEs included in a DCI format scheduling an individual MTC UE that are also included in a DCI format scheduling a group of MTC UEs should be as small as possible even with some acceptable performance degradation or loss of flexibility, as, otherwise, a number of MTC UEs in a group can become too low for group scheduling to be useful.

An advantage of supporting a large number of MTC UEs by group scheduling is in allowing a NodeB scheduler to address any subset of these UEs with a single DCI format, thereby improving scheduler flexibility without transmitting multiple DCI formats and incurring a corresponding signaling overhead. For a total PDSCH BW or a total PUSCH BW including about 6 RBs (e.g., at least for DBB operation), a maximum of 10-12 MTC UEs may be scheduled per subframe (assuming a resource unit of half RB). Therefore, for group scheduling, both a DCI format being able to address up to 12 MTC UEs (but not schedule all of the 12 MTC UEs) and a DCI format being able to address 4 MTC UEs (and possibly schedule all of the 4 MTC UEs) are applicable.

The second exemplary embodiment of the present invention so far assumed that a DCI format scheduling PDSCH for an individual MTC UE has a same size as a DCI format scheduling PUSCH for an individual UE as described by the first exemplary embodiment of the present invention. This is however not a necessary condition for the second exemplary embodiment of the present invention for which an only condition is that a DCI format scheduling a group of MTC UEs for PDSCH or PUSCH has a same size with a DCI format scheduling PDSCH or PUSCH for an individual MTC UE, respectively. If a size of a DCI format for PDSCH scheduling is not same as a size of the DCI format for PUSCH scheduling, whether for an individual MTC UE or for a group of MTC UEs, a flag IE for differentiating DL scheduling from UL scheduling is not needed.

An HARQ-ACK signal transmission from or to an MTC UE in response to a reception of a PDSCH or a transmission of a PUSCH, respectively, through group scheduling by a respective DCI format with CRC scrambled by an MTC-group-RNTI is subsequently considered. An objective is to provide a technique for a communication system to support such HARQ-ACK signaling and for an MTC UE to derive a respective PUCCH or PHICH resource. A PUCCH or PHICH resource determination, as described by Equation (2) and Equation (1), respectively, is assumed but any other reference resource determination may apply.

If an MTC UE transmits an HARQ-ACK signal in response to a detection of a DCI format with CRC scrambled by an MTC-group-RNTI, or in general in response to a detection of a DCI format associated with DL group scheduling, exemplary embodiments of the present invention considers that an MTC UE determines a PUCCH resource for HARQ-ACK signal transmission based on its $MTC_{run\_sum}$ value as determined from an MTC UE identification IE included in the DCI format.

In a first approach, each MTC UE configured for PDSCH group scheduling and with an MTC-group-RNTI is also configured by higher layer signaling a set of PUCCH resources for HARQ-ACK signal transmission. A PUCCH resource for HARQ-ACK signal transmission from a first MTC UE, which is the MTC UE for which a first bit in a bit-map of an MTC UE identification IE is equal to one, may be determined as for a conventional UE and derived from the first CCE used to transmit a PDCCH conveying the DCI format as in Equation (2). A PUCCH resource for HARQ-ACK signal transmission from each remaining MTC UE with actual scheduling, as determined by an MTC UE identification IE, is determined from a set of configured PUCCH resources based on a respective $MTC_{run\_sum}$ value.

Figure 14:
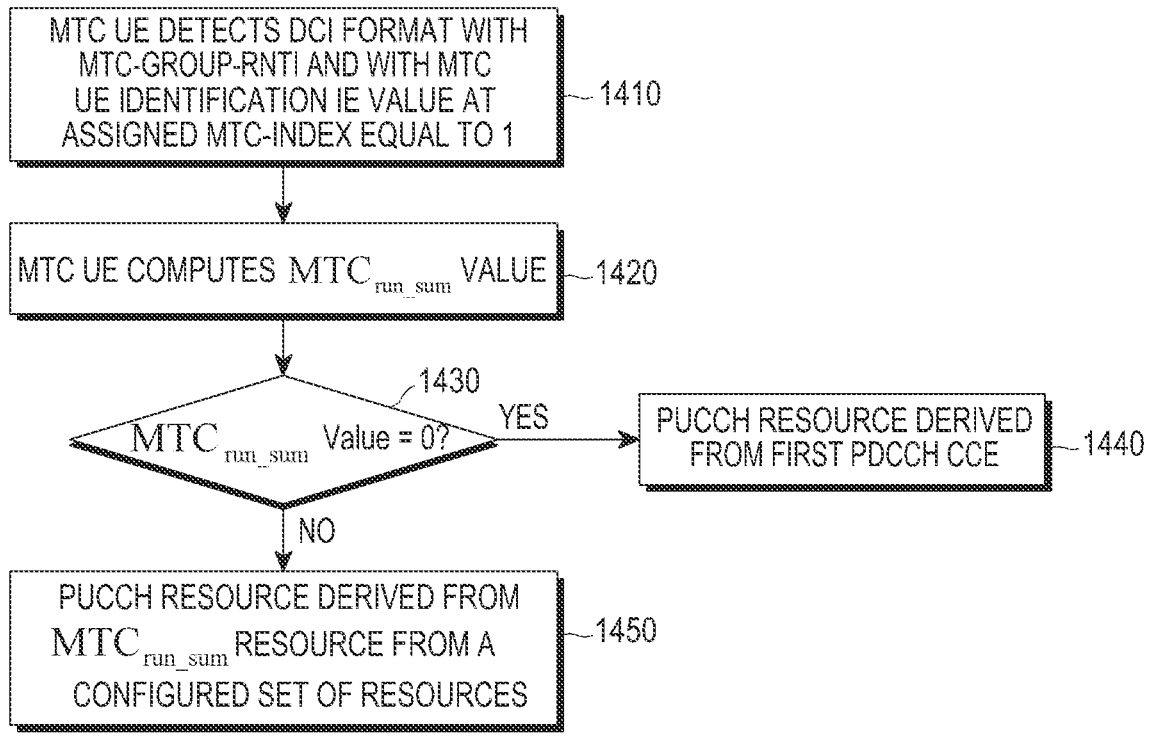
FIG. 14 is a diagram illustrating a first determination of a PUCCH resource by an MTC UE for HARQ-ACK signal transmission in response to a detection of a DCI format with Cyclic Redundancy Check (CRC) scrambled with an MTC-group-RNTI according to an exemplary embodiment of the present invention.

FIG. 14 is a diagram illustrating a first determination of a PUCCH resource by an MTC UE for HARQ-ACK signal transmission in response to a detection of a DCI format with CRC scrambled with an MTC-group-RNTI according to an exemplary embodiment of the present invention.

Referring to FIG. 14, in step 1410, an MTC UE detects a DCI format with MTC-group-RNTI and with MTC UE Identification IE value at its assigned MTC-index equal to 1. Thereafter, an MTC UE computes a respective $MTC_{run\_sum}$ in step 1420. In step 1430, the MTC UE examines its value. For example, the MTC determines whether $MTC_{run\_sum}=0$. If $MTC_{run\_sum}=0$, the MTC UE determines a PUCCH resource for HARQ-ACK signal transmission from a first CCE used to transmit a respective PDCCH in step 1440. Otherwise, if $MTC_{run\_sum}$ does not equal 0, then the MTC UE determines a PUCCH resource for HARQ-ACK signal transmission to be a $MTC_{run\_sum}$ resource from a set of PUCCH resources configured by a NodeB to the MTC UE through higher layer signaling in step 1450.

In a modification of the first approach, a PUCCH resource for HARQ-ACK signal transmission from a first MTC UE with actual scheduling may also be determined from a set of configured PUCCH resources by associating each $MTC_{run\_sum}$ value with a configured PUCCH resource in an ascending order starting from a $MTC_{run\_sum}$ value of 0.

In a second approach, all PUCCH resources may be implicitly derived from a first CCE used to transmit a PDCCH conveying a DCI format scheduling a group of MTC UEs and a $MTC_{run\_sum}$ value for each scheduled MTC UE as determined by an MTC UE identification IE. In this case, it is up to a NodeB scheduler to avoid HARQ-ACK signal transmissions from multiple UEs using a same PUCCH resource.

Figure 15:
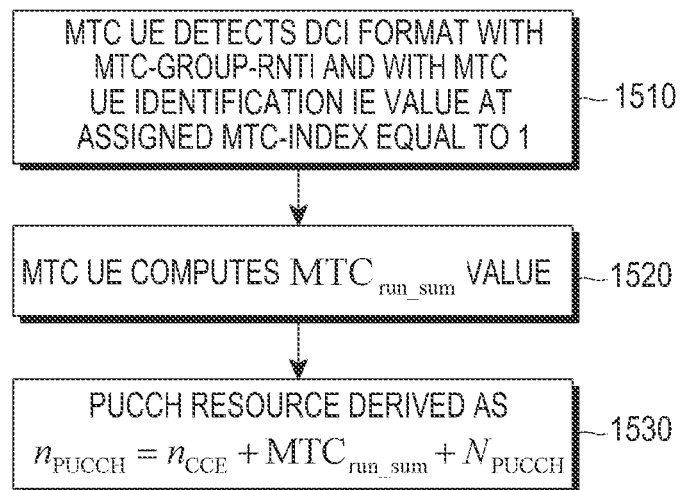
FIG. 15 is a diagram illustrating a second determination of a PUCCH resource for HARQ-ACK signal transmission by an MTC UE in response to a detection of a DCI format with CRC scrambled with an MTC-group-RNTI according to an exemplary embodiment of the present invention.

FIG. 15 is a diagram illustrating a second determination of a PUCCH resource for HARQ-ACK signal transmission by an MTC UE in response to a detection of a DCI format with CRC scrambled with an MTC-group-RNTI according to an exemplary embodiment of the present invention.

Referring to FIG. 15, in step 1510, an MTC UE detects a DCI format with a CRC scrambled by an MTC-group-RNTI and with MTC UE Identification IE value at its assigned MTC-index equal to 1. Thereafter, in step 1520, the MTC UE computes a respective $MTC_{run\_sum}$ value. The MTC UE determines a PUCCH resource $n_{PUCCH}$ for HARQ-ACK signal transmission as $n_{PUCCH}=n_{CCE}+MTC_{run\_sum}+N_{PUCCH}$ in step 1530.

If a HARQ-ACK signal is transmitted by a NodeB to an MTC UE in response to a PUSCH transmission scheduled by a DCI format with CRC scrambled by an MTC-group-RNTI, the MTC UE may also determine a respective PHICH resource based on a $MTC_{run\_sum}$ value as determined from an MTC UE identification IE using similar approaches as for PUCCH resource determination for HARQ-ACK signal transmission from the MTC UE.

In a first approach, PHICH resources for HARQ-ACK signal transmissions to MTC UEs with PUSCH transmissions through group scheduling are configured by higher layer signaling. Each scheduled MTC UE determines a respective PHICH resource, from a configured set of resources, according to a one-to-one mapping between each configured PHICH resource and an MTC$_{run\_sum}$ value where a first configured PHICH resource is mapped to MTC$_{run\_sum}$=0, a second configured PHICH resource is mapped to MTC$_{run\_sum}$=1, and so on.

Figure 16:
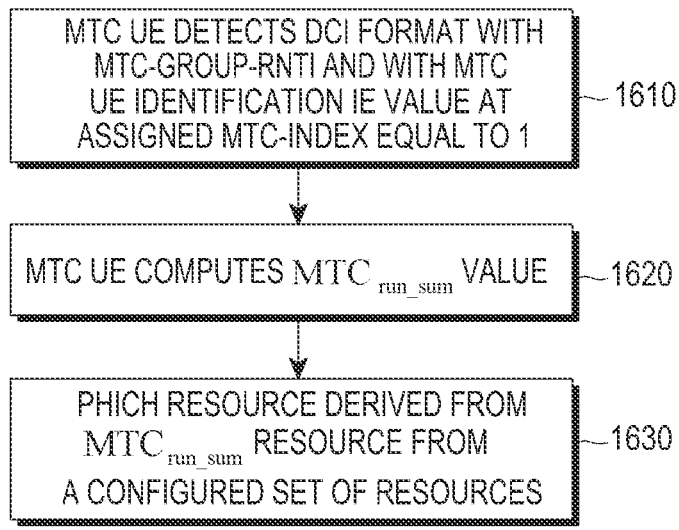
FIG. 16 is a diagram illustrating a first determination of a PHICH resource by an MTC UE for HARQ-ACK signal reception in response to a PUSCH transmission scheduled by a detected DCI format with CRC scrambled with an MTC-group-RNTI according to an exemplary embodiment of the present invention.

FIG. 16 is a diagram illustrating a first determination of a PHICH resource by an MTC UE for HARQ-ACK signal reception in response to a PUSCH transmission scheduled by a detected DCI format with CRC scrambled with an MTC-group-RNTI according to an exemplary embodiment of the present invention.

Referring to FIG. 16, in step 1610, an MTC UE detects a DCI format with MTC-group-RNTI and with MTC UE Identification IE value at its assigned MTC-index equal to 1. Thereafter, in step 1620, the MTC UE computes a respective MTC$_{run\_sum}$. In step 1630, the MTC UE determines a PHICH resource for HARQ-ACK signal reception to be the MTC$_{run\_sum}$ resource from a set of PUCCH resources configured by a NodeB to the MTC UE through higher layer signaling where a first configured PHICH resource maps to MTC$_{run\_sum}$=0, a second configured PHICH resource maps to MTC$_{run\_sum}$=1, and so on.

In a second approach, PHICH resources for HARQ-ACK signal transmissions to MTC UEs with PUSCH transmissions through group scheduling are determined from a first resource MTC$_{RA-start}$ for a respective PUSCH transmission. This is similar to a conventional approach for determining a PHICH transmission resource but $n_{DMRS}$ may not exist and $I_{PRB\_RA}^{lowest\_index}$ is replaced by the MTC$_{run\_sum}$ which an MTC UE determines from an MTC UE identification IE.

Figure 17:
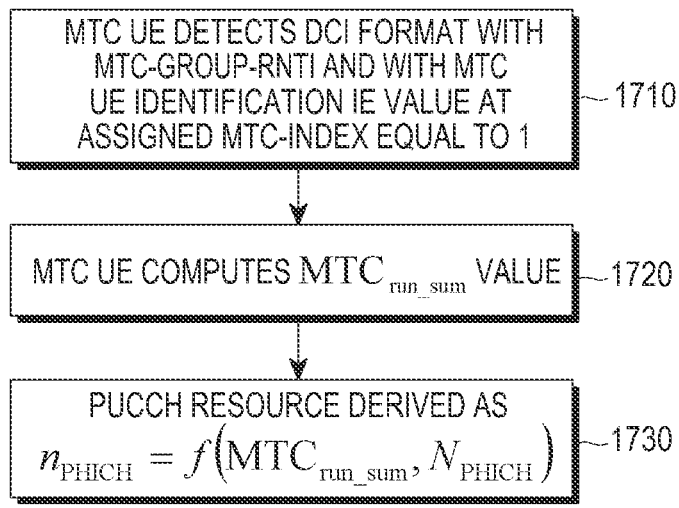
FIG. 17 is a diagram illustrating a second determination of a Physical Hybrid-ARQ Indicator CHannel (PHICH) resource by an MTC UE for HARQ-ACK signal reception in response to a PUSCH transmission scheduled by a detected DCI format with CRC scrambled with an MTC-group-RNTI according to an exemplary embodiment of the present invention.

FIG. 17 is a diagram illustrating a second determination of a PHICH resource by an MTC UE for HARQ-ACK signal reception in response to a PUSCH transmission scheduled by a detected DCI format with CRC scrambled with an MTC-group-RNTI according to an exemplary embodiment of the present invention.

Referring to FIG. 17, in step 1710, an MTC UE detects a DCI format with MTC-group-RNTI and with MTC UE Identification IE value at its assigned MTC-index equal to 1. Thereafter, in step 1720, the MTC UE computes the respective MTC$_{run\_sum}$. In step 1730, the MTC UE determines a PHICH resource $n_{PHICH}$ for HARQ-ACK signal reception as $n_{PHICH}$=f (MTC$_{run\_sum}$, N$_{PHICH}$).

The third exemplary embodiment of the present invention considers a data encoding method in a PDSCH transmitted to an MTC UE and a data encoding method in a PUSCH transmitted from an MTC UE.

Unlike conventional UEs for which a TBS typically exceed about 70 bits and a TC is always used, most data information payloads to MTC UEs are only in the order of a few tens of bits. Moreover, considering a DBB receiver complexity of an MTC UE, a convolutional decoder is preferable to a turbo decoder. Furthermore, an MTC UE already includes convolutional decoders for PDCCH decoding. Therefore, unlike a conventional UE, a data TB transmitted in a PDSCH to an MTC UE may be encoded using a TBCC. A TBS transmitted from an MTC UE in a PUSCH is typically larger than a TBS transmitted to an MTC UE in a PDSCH and, as a turbo encoder complexity is much smaller than a turbo decoder complexity, either a turbo encoder or a convolutional encoder may be used to encode data transmitted from an MTC UE. For a same or similar maximum MCS of data transmitted in a PDSCH or in a PUSCH, a larger maximum TBS for data in a PUSCH than in a PDSCH implies a larger maximum size of frequency resources for a PUSCH than for a PDSCH.

Figure 18:
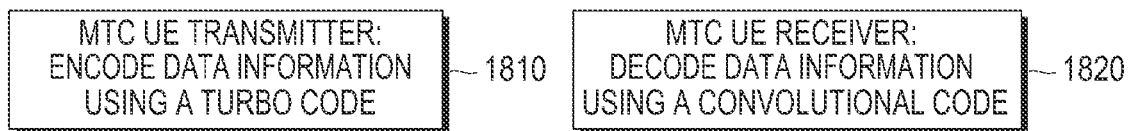
FIG. 18 is a diagram illustrating a selection of an encoding operation for data transmission in a Physical Downlink Shared CHannel (PDSCH) to an MTC UE and an encoding operation for data transmission in a PUSCH from an MTC UE according to an exemplary embodiment of the present invention.

FIG. 18 is a diagram illustrating a selection of an encoding operation for data transmission in a PDSCH to an MTC UE and an encoding operation for data transmission in a PUSCH from n MTC UE according to an exemplary embodiment of the present invention.

Referring to FIG. 18, in step 1810, an MTC UE encodes a data information using a TC. In step 1820, the MTC UE decodes a data information using a TBCC. The reverse operations are performed at a NodeB (decoding using a TC and encoding using a convolutional code such as, for example, a TBCC).

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for a user equipment (UE), the method comprising:
   receiving first physical downlink control channel (PDCCH) candidates based on a first fixed number of PDCCH candidates per respective control channel element (CCE) aggregation levels for a first set of CCE aggregation levels, during an initial access process;
   receiving, via a higher layer signaling, configuration information related to a second number of PDCCH candidates per respective CCE aggregation levels in a second set of CCE aggregation levels; and
   receiving second PDCCH candidates based on the second number of PDCCH candidates per respective CCE aggregation levels in the second set of CCE aggregation levels, after receiving the configuration information.

2. The method of claim 1, further comprising:
   detecting, from the first PDCCH candidates, a PDCCH to schedule a physical downlink shared channel (PDSCH) conveying the configuration information.

3. The method of claim 1, wherein the configuration information includes the second number for the second PDCCH candidates per respective CCE aggregation levels and the second set of CCE aggregation levels.

4. The method of claim 1, further comprising:
   detecting, from the second PDCCH candidates, a first PDCCH scheduling a physical downlink shared channel (PDSCH), the first PDCCH comprising a first resource allocation (RA) information element (IE) which is represented by a first number of bits and allocating first resources for a transmission of the PDSCH; and
   detecting, from the second PDCCH candidates, a second PDCCH scheduling a physical uplink shared channel (PUSCH), the second PDCCH comprising a second RA IE which is represented by a second number of bits and allocating second resources for a transmission of the PUSCH,
   wherein the first RA IE indicates the first resources with a bandwidth (BW) granularity for the PDSCH, the second RA IE indicates the second resources with a reduced BW granularity for the PUSCH.

5. An apparatus in a user equipment (UE), the apparatus comprising:
   a transceiver; and
   a processor configured to control the transceiver to:
   receive first physical downlink control channel (PDCCH) candidates based on a first fixed number of PDCCH candidates per respective control channel element (CCE) aggregation levels for a first set of CCE aggregation levels, during an initial access process,
receive, via higher layer signaling, configuration information of a second number of PDCCH candidates per respective CCE aggregation levels in a second set of CCE aggregation levels, and
receive second PDCCH candidates based on the second number of PDCCH candidates per respective CCE aggregation levels in the second set of CCE aggregation levels, after receiving the configuration information.

6. The apparatus of claim 5, wherein the processor is configured to:
detect, from the first PDCCH candidates, a PDCCH to schedule a physical downlink shared channel (PDSCH) conveying the configuration information.

7. The apparatus of claim 5, wherein the configuration information includes the second number for the second PDCCH candidates per respective CCE aggregation levels and the second set of CCE aggregation levels.

8. The apparatus of claim 5, wherein the processor is configured to:
detect, from the second PDCCH candidates, a first PDCCH scheduling a physical downlink shared channel (PDSCH), the first PDCCH comprising a first resource allocation (RA) information element (IE) which is represented by a first number of bits and allocating first resources for a transmission of the PDSCH; and
detect, from the second PDCCH candidates, a second PDCCH scheduling a physical uplink shared channel (PUSCH), the second PDCCH comprising a second RA IE which is represented by a second number of bits and allocating second resources for a transmission of the PUSCH,
wherein the first RA IE indicates the first resources with a bandwidth (BW) granularity for the PDSCH, the second RA IE indicates the second resources with a reduced BW granularity for the PUSCH.

* * * * *